(12) United States Patent
Satoh et al.

(10) Patent No.: US 9,176,474 B2
(45) Date of Patent: Nov. 3, 2015

(54) LIGHT-CONCENTRATING FILM, METHOD FOR PRODUCING SAME, FOCUSING ELEMENT, SOLAR CELL, AND FOCUSING METHOD

(75) Inventors: Kazuyuki Satoh, Settsu (JP); Hidenori Ozaki, Settsu (JP); Takayuki Araki, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 835 days.

(21) Appl. No.: 13/393,920

(22) PCT Filed: Sep. 10, 2010

(86) PCT No.: PCT/JP2010/065636
§ 371 (c)(1),
(2), (4) Date: Mar. 2, 2012

(87) PCT Pub. No.: WO2011/030858
PCT Pub. Date: Mar. 17, 2011

(65) Prior Publication Data
US 2012/0156434 A1    Jun. 21, 2012

(30) Foreign Application Priority Data
Sep. 11, 2009    (JP) .................................. 2009-210765

(51) Int. Cl.
| B32B 3/00 | (2006.01) |
| B29D 11/00 | (2006.01) |
| G03H 1/08 | (2006.01) |
| G02B 5/18 | (2006.01) |
| G02B 5/32 | (2006.01) |

(52) U.S. Cl.
CPC ................ G03H 1/08 (2013.01); G02B 5/1895 (2013.01); G02B 5/32 (2013.01); *G03H 2001/085* (2013.01); *G03H 2240/23* (2013.01); *Y10T 428/24479* (2015.01)

(58) Field of Classification Search
CPC .............. B32B 3/00; B32B 3/30; G02B 1/04; G02B 3/08; G02B 5/1895; G02B 5/32; G03H 1/08; G03H 2240/23; G03H 2001/085
USPC .......... 428/156, 167, 172; 359/454, 457, 742, 359/625, 626; 136/259; 264/1.1, 2.5, 1.37
See application file for complete search history.

(56) References Cited

FOREIGN PATENT DOCUMENTS

| DE | 41 10 614 A1 | 10/1992 |
| GB | 2 021 807 A | 12/1979 |
| JP | 11-326605 A | 11/1999 |
| JP | 2002-228819 A | 8/2002 |
| JP | 2002-357702 A | 12/2002 |
| JP | 2004-206254 A | 7/2004 |
| JP | 2005-189264 A | 7/2005 |
| JP | 2005-189264 A | 7/2005 |
| JP | 3687836 B2 | 8/2005 |
| JP | 2007-271857 A | 10/2007 |

OTHER PUBLICATIONS

Machine translation of JP 2007-271857; Furuya et al.; published Oct. 18, 2007.*
Extended European Search Report issued on Feb. 6, 2014 for counterpart EP Appln. No. 10815452.7.

\* cited by examiner

*Primary Examiner* — Catherine A Simone
(74) *Attorney, Agent, or Firm* — Sughrue Mion, PLLC

(57) ABSTRACT

The present invention provides a focusing method and a light-concentrating film capable of concentrating incident light in a wide angular range with high efficiency, a focusing element including the light-concentrating film, and a solar cell. The present invention is a light-concentrating film that is made of an organic material, and is characterized by having a multi-level gradation pattern.

14 Claims, 6 Drawing Sheets

(a)

1um (b)

1um (a)

(b)

(c)

(d)

(e)

LIGHT-CONCENTRATING FILM, METHOD FOR PRODUCING SAME, FOCUSING ELEMENT, SOLAR CELL, AND FOCUSING METHOD

CROSS REFERENCE TO RELATED APPLICATIONS

This application is a National Stage of International Application No. PCT/JP2010/065636 filed on Sep. 10, 2010, which claims priority from Japanese Patent Application No. 2009-210765 filed Sep. 11, 2009, the contents of all of which are incorporated herein by reference in their entirety.

TECHNICAL FIELD

The present invention relates to a light-concentrating film and a method for producing the same, a focusing element including the light-concentrating film, a solar cell including the focusing element, and a focusing method using the light-concentrating film.

BACKGROUND ART

In recent years, in response to the emerging energy resource problems and global environmental problems, the photovoltaic power generation has increased in importance. Thus, expansion of use of the photovoltaic power generation and development of an energy supply technology have been carried out enthusiastically.

The photovoltaic power generation aims at a general-purpose power-level generating cost from the viewpoint of the cost efficiency. This leads to a demand for a solar cell capable of reducing the module manufacturing cost, and having a high generating efficiency.

As a method for enhancing the generating efficiency, an increase in focusing efficiency to a photovoltaic cell can be considered. Conventionally, as optical members for concentrating light, mention may be made of (1) lenses (spherical and aspherical types), (2) concave mirrors, (3) planar films, and the like.

As the planar films, optical members such as a Fresnel lens have been under development (see, e.g., Patent Document 1). However, conventional planar films each cannot concentrate light incident at a shallow angle with respect to the in-plane direction of the planar film. When used as a light-concentrating film for solar cell, in order to perform electric power generation with efficiency, the planar film is required to be a so-called tracking type solar cell in which the orientation of the solar battery cell is allowed to track the direction of radiation of sunlight. The tracking type solar cell is a system controlled so as to cause a focusing element to continuously face the direction of the sun. Accordingly, the whole system is in a complicated structure, posing problems in terms of cost and facilities.

Further, as the planar films, optical elements using hologram are also known. For example, mention may be made of a hologram manufactured by laser imprinting a hologram diffraction pattern onto a photosensitive material. For the formation of such a hologram diffraction pattern, there is used the following method: for a photosensitive material such as gelatin dichromate, the interference fringes of a reference light and an object light such as a laser light are recorded on the photosensitive material surface, and information of the complex amplitude of the object light is optically fixed on the recording surface. However, the photosensitive material lacks the durability (moisture resistance, weather resistance). For this reason, when the planar film having the hologram diffraction pattern is used for a solar cell, it is to be mounted in the inside of the solar battery cell. This results in a solar battery cell of the total internal reflection system as disclosed in, for example, Non-Patent Document 1. Therefore, the solar cell does not concentrate light in a wide angular range (omnidirectional light concentration) in terms of the structure.

On the other hand, not a hologram diffraction pattern laser-imprinted on a photosensitive material but a CGH: Computer Generated Hologram formed by calculating a diffraction pattern by a computer is also proposed.

Patent Document 2 discloses an optical splitter having at least one first optical system, a hologram element having a diffraction grating pattern for splitting light emitted radially from the first optical system into a plurality of luminous fluxes, and focusing the luminous fluxes to a plurality of spots, and a plurality of second optical systems with the light-receptive parts disposed at positions corresponding to the plurality of spots. It is described that determination of the optical phase of the diffraction plane of the hologram element can be designed by a computer generated hologram technology using a computer. However, such a conventional hologram element cannot concentrate incident light in a wide angular range.

Incidentally, Patent Document 3 discloses that the computer generated hologram is calculated using Fourier transform. However, for the computer generated hologram disclosed in Patent Document 3, the base material is quartz, and the resulting gradation pattern also remains on the quartz surface. For this reason, the uses thereof are limited to display devices and the like, and the computer generated hologram is not used for light concentration.

[Patent Document 1] JP-B 3687836
[Patent Document 2] JP-A 2002-228819
[Patent Document 3] JP-A 2004-206254
[Non-Patent Document 1] Glenn Rosenberg, et al., "Holographic planar concentrator increases solar-panel efficiency", Laser Focus World Japan, Japan, 2009, vol. 2, p. 26-28

SUMMARY OF THE INVENTION

Problems to be Solved by the Invention

Even when a hologram manufactured from laser-imprinting on a conventional photosensitive material is used for a light-concentrating film, it lacks the weather resistance, the moisture resistance, and the like. For this reason, it is not possible to form an optical element achieving omnidirectional light concentration. Further, the computer generated holograms used in conventional optical elements are only those having a pattern of spatial modulation degree due to binary gradation. Thus, even when the computer generated holograms are applied to light-concentrating films, it is not possible to concentrate incident light in a wide angular range.

An object of the present invention is to provide a light-concentrating film capable of concentrating incident light in a wide angular range, a focusing element including the light-concentrating film, and a solar cell, and a focusing method capable of concentrating incident light in a wide angular range with high efficiency.

Means for Solving the Problems

The present invention is a light-concentrating film, which is a transmission type light-concentrating film made of an organic material, characterized by having a multilevel gradation pattern.

The present invention is also a focusing element characterized by including the light-concentrating film.

The present invention is further a solar cell characterized by including the focusing element.

The present invention is also a method for producing the light-concentrating film, characterized by including a step of calculating a multilevel gradation pattern using discrete Fourier transform, and a step of forming the light-concentrating film having the multilevel gradation pattern.

The present invention is also a focusing method using the light-concentrating film, characterized by including a step of making light incident upon a side of the light-concentrating film having the multilevel gradation pattern, and, a step of emitting the incident light from a side of the light-concentrating film, opposite to the light incident side.

Below, the present invention will be described in details.

The light-concentrating film of the present invention is a transmission type light-concentrating film made of an organic material. The "transmission type light-concentrating film" means a light-concentrating film for emitting light incident upon one side of the light-concentrating film from the side opposite to the light incident side.

The light-concentrating film of the present invention has a multilevel gradation pattern. The inclusion of the multilevel gradation pattern enables the in-plane light concentration in a wide angular range. The multilevel gradation pattern is a pattern also referred to as a computer generated multilevel hologram grating pattern, or the like.

The multilevel gradation pattern preferably forms a computer generated hologram. Namely, the light-concentrating film of the present invention preferably includes a computer generated hologram having a multilevel gradation pattern. The computer generated hologram is not formed by formation of interference fringes of a reference light and an object light. Therefore, as a material for forming a light-concentrating film, a photosensitive material is not required to be used. Thus, it is possible to form a hologram having durability.

The "multilevel gradation pattern" in the present description is a pattern having a multilevel gradation calculated by a computer. The "multilevel gradation" means a gradation having three or more values, and is distinguished from binary gradation. Further, it is also distinguished from a waveform pattern including phase information recorded therein such as a hologram diffraction pattern laser imprinted on an organic material. Herein, "gradation" means the degree of changes in film thickness of the light-concentrating film. For example, the light-concentrating films having a multilevel gradation pattern results in those having film thickness values of three or more stages.

The multilevel gradation pattern is preferably a pattern including a combination of two or more recessed portions having different depths. The shape of each recessed portion when the multilevel gradation pattern is viewed from above may be a tetragon as shown in FIG. 9(a), may be a circle as shown in FIG. 9(b), or may be an ellipse as shown in FIG. 9(e), or the like. In the multilevel gradation pattern, the recessed portions may be present each independently, or present in continuously connected relation. Further, the shape as seen in cross section may be a triangle as shown in FIG. 9(c), or may be a semicircle or a semiellipse as shown in FIG. 9(d). Further, the multilevel gradation pattern is preferably a pattern based on concentric circles, quadrangular pyramids or triangular pyramids. For example, the multilevel gradation pattern is preferably the one including two or more connected gradation patterns each decreasing in film thickness of the light-concentrating film in a circular cone form, a quadrangular pyramid form, or a triangular pyramid form, or is also preferably the one including the gradation patterns connected in a grid form. The two or more gradation patterns each decreasing in film thickness of the light-concentrating film in a circular cone form, a quadrangular pyramid form, or a triangular pyramid form may be connected over the entire surface. The "circular cone form, quadrangular pyramid form, or triangular pyramid form" may include any shape recognizable as generally a circular cone form, a quadrangular pyramid form, or a triangular pyramid form. Further, the multilevel gradation pattern is preferably a 4- to 32-gradation pattern.

The recessed portion is a portion at which the thickness of the light-concentrating film smaller than the maximum thickness of the light-concentrating film in a region having a multilevel gradation pattern. For example, it is essential only that the depth of the recessed portion is 10% or more of the maximum thickness of the light-concentrating film in a region having a multilevel gradation pattern. In FIG. 9, L represents the pitch of the recessed portions, and d represents the depth of each recessed portion.

The multilevel gradation pattern is, for example, a pattern including a combination of two or more recessed portions having bottoms substantially parallel in the in-plane direction of the light-concentrating film. The two or more recessed portions are preferably those including at least two recessed portions having different depths. It is essential only that the multilevel gradation pattern includes a combination of at least two recessed portions having different depths. The multilevel gradation pattern may have a plurality of recessed portions having substantially the same depth. The recessed portion generally has a side surface part substantially perpendicular to the in-plane direction of the light-concentrating film. However, in the case where a plurality of recessed portions are combined to form a multilevel gradation pattern, the recessed portion may have no side surface part when it is smaller in depth than the adjacent recessed portions.

As the multilevel gradation pattern, for example, mention may be made of the form as shown in a cross-sectional schematic view of a light-concentrating film of FIG. 1. The multilevel gradation pattern of the light-concentrating film shown in FIG. 1 includes recessed portions 11a, 11b, 11c, 11d, 11e, and 11f. In the region having the multilevel gradation pattern, the maximum thickness is $d_{max}$, and the minimum thickness is $d_{min}$. For example, the recessed portion 11d has a bottom 12 and a side surface part 13. The depth of the recessed portion is appropriately set according to the material forming the light-concentrating film, and the size, shape, and the like of the light-concentrating film. Incidentally, herein, the "depth of the recessed portion" means a distance from the surface having the multilevel gradation pattern to the opposite side surface with respect to the maximum thickness of the light-concentrating film in the region having the multilevel gradation pattern. For example, the depth $d_f$ of the recessed portion 11d in FIG. 1 is the distance expressed as $d_{max} - d_{min}$. The depth of the recessed portion is preferably, for example, 0.01 μm to 100 μm, and more preferably 0.1 μm to 30 μm.

In the light-concentrating film, in a region having a multilevel gradation pattern, a ratio of the minimum thickness ($d_{min}$) to the maximum thickness ($d_{max}$) is preferably 25% or less. In order to sufficiently enhance the focusing efficiency as the light-concentrating film, in the multilevel gradation pattern, the difference between the maximum thickness and the minimum thickness is preferably larger. This can implement a light-concentrating film with high focusing efficiency. Incidentally, in the computer generated hologram having a binary gradation, the ratio of the minimum thickness to the maximum thickness is 50%. Incidentally, the "region having a multilevel gradation pattern" means a region in which the gradation is formed. For example, when a mold is used for forming a multilevel gradation pattern as described later, the region means a region which was in contact with the region of the mold in which the reversal pattern of the multilevel gradation pattern is formed.

In the light-concentrating film, the pitch (interval) of the multilevel gradation pattern is preferably 100 μm or less. It is more preferably 10 μm or less, and further preferably 1 μm or less. The pitch of the multilevel gradation pattern is generally equal to the width of the recessed portion. When the recessed portion is a tetragon in plan view, the width of the recessed portion is preferably the length of the smallest side of the tetragon. It is essential only that the width of at least one recessed portion falls within the foregoing range. The preferable mode in such a case where the shape of the recessed portion in plan view or in cross-sectional view is a tetragon is also similarly preferable in the case where the shape of the recessed portion in plan view is a circle, a triangle, or the like.

In the multilevel gradation pattern, the thickness of the phase hologram is preferably larger than the interval of the interference fringes. By setting the thickness of the phase hologram larger than the interval of the interference fringes, it is possible to record and transfer (multiple record) diffracted light in a multi-stacked manner on the same site. This can implement a light-concentrating film excellent in angle selectivity, which enables incident light in a wide angular range to be concentrated in a given one direction. As the mode in which the thickness of the phase hologram is larger than the interval of the interference fringes, mention may be made of, for example, a mode in which the depth of the recessed portion forming the multilevel gradation pattern is larger than the width of the recessed portion. Namely, the multilevel gradation pattern is a pattern including a combination of two or more recessed portions with different depths. The depth of at least one recessed portion is preferably larger than the width of the recessed portion. Further, the end face depth ($d_a$) of the recessed portion and the width (L) of the recessed portion preferably satisfy the following expression (α):

$$L/d_a \leq 2 \tag{α}$$

For example, in the recessed portion 11d of the gradation pattern shown in FIG. 1, when the width $L_f$ of the recessed portion 11d and the end face distance $d_a$ in the direction of depth (the direction of the normal) of the gradation pattern satisfy $L_f/d_a \leq 2$, as described above, the function as the in-plane light-concentrating film for concentrating incident light in a wide angular range in a given one direction becomes more excellent. It is essential only that, in the recessed portions forming the multilevel gradation pattern, the recessed portion having the smallest width satisfies the expression (α). It is more preferable that substantially all the recessed portions satisfy the expression (α). In the case where substantially all the recessed portions satisfy the expression (α), when there is a recessed portion not having a side surface part, the recessed portion does not satisfy the expression (α). Incidentally, the end face depth (end face distance) $d_a$ of the recessed portion represents the length of each step end face in the multilevel gradation pattern, and the length of the side surface part (end face) shortest in the direction of the normal to the light-concentrating film in the side surface part of the recessed portion.

The multilevel gradation pattern is preferably a pattern calculated using discrete Fourier transform. For a computer generated hologram calculated using conventional Fourier transform, calculation of a hologram for performing light concentration in a wide angular range requires a large capacity of processing. This makes it impossible to calculate a large-area computer generated hologram for use in the light-concentrating film. Thus, the computer generated holograms for use in the light-concentrating film have been limited to those with binary gradation.

Use of discrete Fourier transform dramatically improves the operation speed, which enables the calculation of a high-quality and large-area computer generated hologram. This makes the computer generated hologram to be applicable to the light-concentrating film.

The discrete Fourier transform can be carried out using a Fourier transform device. The Fourier transform device is a Fourier transform device which executes discrete Fourier transform on the input data of N points (N is an integer of 2 or more). The Fourier transform device includes: a phase correction part for changing the phases of input data of N points, and generating m groups (m is an integer of 2 or more) of phase corrected data of N points; a Fourier transform part for subjecting respective groups of phase corrected data generated at the phase correction part to discrete Fourier transform in parallel, and generating m groups of converted data of N points; and a synthesizer for synthesizing m groups of the converted data of N points generated at the Fourier transform part, and generating synthetic data of L points (L is an integer m times as large as N). Preferably, the phase correction part multiplies the input data by the power of a rotation factor having periods of L points, and thereby generates phase corrected data, and the Fourier transform part executes discrete Fourier transform of N points using the power of the rotation factor having periods of N points on each group of phase corrected data. The input data may be appropriately set so as to obtain the objective characteristics of the light-concentrating film, and have no particular restriction.

The phase correction part includes 0th to (m−1)th phase correctors for changing the phases of the input data of N points, and operating in parallel with one another. The q-th (q is an integer of 0 to m−1) phase corrector preferably multiplies the input data by the integral multiple power of q of the rotation factor having periods of L points, and thereby generates the phase corrected data.

Preferably, the q-th phase corrector multiplies the k-th (k is an integer of 0 to N−1) input data x(k) of the input data of N points by qk-th power of the rotation factor $W_L$ specified by the following equation (A), and thereby calculates the phase corrected data $x_C(k, q)$ expressed by the following equation (B); and the Fourier transform part executes discrete Fourier transform of the N points based on the following equation (D) using the rotation factor $W_N$ specified by the following equation (C) on the phase corrected data $x_C(k,q)$ outputted from the q-th phase corrector, and generates the converted data X(mp+q) (p is an integer of 0 to N−1) of the N points.

[Mathematical Expression 1]

$$W_L = \exp\left[-i\frac{2\pi}{L}\right] \tag{A}$$

[Mathematical Expression 2]

$$x_C(k,q) = x(k) W_L^{qk} \tag{B}$$

[Mathematical Expression 3]

$$W_N = \exp\left[-i\frac{2\pi}{N}\right] \quad (C)$$

[Mathematical Expression 4]

$$X(mp+q) = \sum_{k=0}^{N-1} x_C(k,q) W_N^{pk} \quad (D)$$

The Fourier transform device preferably further includes a phase corrector for adjusting the phase of the synthetic data.

The Fourier transform part preferably has a function of executing high-speed Fourier transform of N points.

FIG. 7 is a block diagram schematically showing one example of the Fourier transform device. As shown in FIG. 7, a Fourier transform device 75 includes a sampling circuit 70, a phase correction part 71, a Fourier transform part 72, a synthesizer 73, and a phase corrector 74. The sampling circuit 70 samples input data x(k) (k is an integer of 0 to N−1) of N points, and branches the input data x(k) into m groups (m is an integral multiple of N) of input data x(k), x(k), . . . , x(k) and outputs them to the phase correction part 71.

Further, the phase correction part 71 includes 0th to m−1th phase correctors $71_0$ to $71_{m-1}$ for changing the phases of the input data x(k), and operating in parallel with one another. The 0th to m−1th phase correctors $71_0$ to $71_{m-1}$ generate phase corrected data $x_C(k,0)$ to $x_C(k,m-1)$, respectively, and output them to the Fourier transform part 72.

Further, the Fourier transform part 72 includes a plurality of FFT computing units $72_0$ to $72_{m-1}$ for executing FFT (fast Fourier transform) of N points. The FFT computing units $72_0$ to $72_{m-1}$ execute FFT on the phase corrected data of N points inputted from the phase correctors $71_0$ to $71_{m-1}$, respectively, and output the converted data of the processing results to the synthesizer 73. Further, the synthesizer 73 synthesizes m groups of converted data of N points inputted from the FFT computing unit 72 with a method described later, generates synthetic data X(n) (n is an integer of 0 to L−1) of a total of L (=mN) points, and outputs them to the phase corrector 74. Then, the phase corrector 74 changes the phase of the synthetic data X(n) in a prescribed amount, and generates output data, and outputs it. The method of executing calculation using discrete Fourier transform is described in details in JP-A 2004-206254. Further, the multilevel gradation pattern can be obtained using, other than discrete Fourier transform, iterative Fourier transform. The calculation methods are described in details in Non-Patent Document ("Applied Optics", 1994, vol. 33, pp 863-867).

For the light-concentrating film, the light transmittance at a wavelength of 550 nm for incidence at an angle of 0° to 89° with respect to the direction of the normal to the light-concentrating film is preferably an average of 80% or more. It is more preferably an average of 90% or more, and further preferably an average of 95% or more. By increasing the light transmittance of the organic material forming the light-concentrating film, it is also possible to improve the focusing efficiency. Further, by increasing the light transmittance, it is possible to suppress deterioration due to heat storage and the like. These enable long-term use, which allows the light-concentrating film to be used in particular preferably for solar cell use or other uses. The light transmittance can be measured by a method using a UV-visible spectrophotometer (U-4100 Spectrophotometer, manufactured by Hitachi High-Technologies Corporation).

Further, for the light-concentrating film, the light transmittance at a wavelength of 550 nm, for incidence at an angle of 0° to 89° with respect to the direction of the normal to the light-concentrating film is preferably 80% or more at substantially all angles. The light transmittance is more preferably 90% or more, and further preferably 95% or more. Incidentally, the angle of 0° with respect to the normal direction represents the angle of the vertical axis. Whereas, the angle of 89° with respect to the normal direction represents the angle of the horizontal axis of 1°. Incidentally, for the light transmittance, there can be adopted a value obtained by averaging the values measured at an interval of 2° in the range of 0 to 89° with the number of measurement values. It is also preferable that the light transmittance at a wavelength of 550 nm for incidence at an angle of 0 to 89° with respect to the direction of the normal to the light-concentrating film is the light transmittance at a wavelength of 550 nm for incidence upon a region having a multilevel gradation pattern.

For the organic material forming the light-concentrating film of the present invention, the refractive index at a wavelength of 350 to 800 nm is preferably 1.30 to 1.65. The upper limit of the refractive index is more preferably 1.60, and further preferably 1.55. The lower limit of the refractive index is more preferably 1.35, and further preferably 1.40. The refractive index can be measured by a method using an Abbe refractometer (Digital thermometer 2T, manufactured by ATAGO CO. LTD.). For the measurement, measuring was performed at 25° C., and as a light source wavelength, a 589-nm sodium D line was used. Incidentally, the optimum refractive index for light-concentrating film use is preferably, for example, 1.40. It is also preferably 1.42.

The organic material has no particular restriction. However, it is preferably a thermoplastic resin, and is preferably, for example, at least one compound selected from the group consisting of PMMA (polymethyl methacrylate), PC (polycarbonate), PEN (polyethylene naphthalate), PET (polyethylene terephthalate), TAC (triacetyl cellulose), PES (polyether sulfone), and fluororesin. The thermoplastic resins are also so-called weather resistant organic materials.

Further, other than the thermoplastic resins, there can also be used polymer materials such as curable resins described later as coating layers over the resins, organic/inorganic nanocomposite materials for use as sol/gel materials and the like, and other materials.

The organic material is also preferably a fluororesin. Conventionally, for plastic type optical members, PMMA (polymethyl methacrylate) materials have been used. However, for forming, additives such as a plasticizer and a thermal oxidation inhibitor are added. Even when the materials are each used as a focusing element for solar cell, there is a problem such as yellowing (increase in ΔYI value); which makes the practical use thereof impossible.

The fluororesin is excellent in weather resistance, heat resistance, anti-water vapor permeability, transparency, and the like. This prevents deterioration of the material due to sunlight and the like, which can provide a light-concentrating film having long-term durability. Further, the fluororesin is also excellent in optical transparency.

The fluororesin has no particular restriction so long as it is a melt-processable fluororesin. However, it is preferably a homopolymer or a copolymer having a repeating unit derived from at least one fluorinated ethylenic monomer.

The fluororesin may be the one resulting from polymerization of only fluorinated ethylenic monomers, or may be the one resulting from polymerization of fluorinated ethylenic monomers and ethlenic monomers not having a fluorine atom.

The fluororesin preferably has a repeating unit derived from at least one fluorinated ethylenic monomer selected from the group consisting of tetrafluoroethylene [TFE], vinylidene fluoride [VdF], chlorotrifluoroethylene [CTFE], vinyl fluoride, hexafluoropropylene [HFP], hexafluoroisobutene, a monomer represented by $CH_2=CZ^1(CF_2)_nZ^2$ (where $Z^1$ is H or F, $Z^2$ is H, F, or Cl, and n is an integer of 1 to 10), perfluoro(alkyl vinyl ether) [PAVE] represented by $CF_2=CF-ORf^1$ (where $Rf^1$ represents a perfluoroalkyl group having 1 to 8 carbon atoms), and an alkyl perfluorovinyl ether derivative represented by $CF_2=CF-O-CH_2-Rf^2$ (where $Rf^2$ is a perfluoroalkyl group having 1 to 5 carbon atoms).

As the PAVE, mention may be made of perfluoro (methyl vinyl ether) [PMVE], perfluoro(ethyl vinyl ether) [PEVE], perfluoro(propyl vinyl ether) [PPVE], perfluoro(butyl vinyl ether), or the like. Out of these, PMVE, PEVE, or PPVE is more preferable.

The alkyl perfluorovinyl ether derivative is preferably the one in which $Rf^2$ is a perfluoroalkyl group having 1 to 3 carbon atoms, and more preferably $CF_2=CF-O-CH_2-CF_2CF_3$.

The fluororesin may have a repeating unit derived from an ethylenic monomer not having a fluorine atom. In view of keeping the heat resistance, the chemical resistance, and the like, it is also one of preferable modes that the fluororesin has a repeating unit derived from an ethylenic monomer having 5 or less carbon atoms. It is also preferable that the fluororesin has at least one non-fluorine-containing ethylenic monomer selected from the group consisting of ethylene, propylene, 1-butene, 2-butene, vinyl chloride, vinylidene chloride, and unsaturated carboxylic acids.

The unsaturated carboxylic acid is preferably the one having at least one copolymerizable carbon-carbon unsaturated bond per molecule, and having at least one carbonyloxy group [—C(=O)—O—] per molecule, and may be aliphatic unsaturated monocarboxylic acid, or may be aliphatic unsaturated polycarboxylic acid having two or more carboxyl groups. For example, mention may be made of the unsaturated carboxylic acids described in WO 2005/100420 A1.

The aliphatic unsaturated carboxylic acid is preferably at least one selected from the group consisting of (meth)acrylic acid, crotonic acid, maleic acid, maleic anhydride, fumaric acid, itaconic acid, itaconic anhydride, citraconic acid, citraconic anhydride, mesaconic acid, and aconitic acid.

The fluororesin is preferably at least one selected from the group consisting of polychlorotrifluoroethylene [PCTFE], ethylene [Et]/TFE copolymer [ETFE], CTFE/TFE copolymer, TFE/HFP copolymer [FEP], TFE/PAVE copolymer [PFA], and polyvinylidene fluoride [PVdF], and more preferably at least one fluororesin selected from the group consisting of PCTFE, ETFE, CTFE/TFE copolymer, FEP, and PFA.

For the chlorotrifluoroethylene [CTFE]/tetrafluoroethylene [TFE] copolymer, the mole ratio of CTFE units to TFE units is preferably CTFE: TFE=2:98 to 98:2, more preferably 5:95 to 90:10, and further preferably 20:80 to 90:10. When the CTFE units are too small in amount, melt processing tends to become difficult. Too much amount may deteriorate the heat resistance and the chemical resistance during forming.

The CTFE/TFE copolymer is preferably a copolymer including CTFE, TFE, and a monomer copolymerizable with CTFE and TFE. As the monomers copolymerizable with CTFE and TFE, mention may be made of ethylene, VdF, HFP, a monomer represented by $CH_2=CZ^1(CF_2)_nZ^2$ (where $Z^1$ is H or F, $Z^2$ is H, F, or Cl, and n is an integer of 1 to 10), perfluoro(alkyl vinyl ether) [PAVE] represented by $CF_2=CF-ORf^1$ (where $Rf^1$ represents a perfluoroalkyl group having 1 to 8 carbon atoms), an alkyl perfluorovinyl ether derivative represented by $CF_2=CF-O-CH_2-Rf^5$ (where $Rf^5$ represents a perfluoroalkyl group having 1 to 5 carbon atoms), and the like. Out of these, it is preferably at least one selected from the group consisting of ethylene, VdF, HFP, and PAVE, and more preferably PAVE.

As the PAVE, mention may be made of perfluoro(methyl vinyl ether) [PMVE], perfluoro(ethyl vinyl ether) [PEVE], perfluoro(propyl vinyl ether) [PPVE], perfluoro(butyl vinyl ether), or the like. Out of these, PMVE, PEVE, or PPVE is more preferable.

The alkyl perfluorovinyl ether derivative is preferably the one in which $Rf^5$ is a perfluoroalkyl group having 1 to 3 carbon atoms, and more preferably $CF_2=CF-O-CH_2-CF_2CF_3$.

The CTFE/TFE copolymer preferably includes monomer units derived from monomers copolymerizable with CTFE and TFE in an amount of 0.1 to 10 mol %, and a CTFE unit and a TFE unit in a total amount of 90 to 99.9 mol %. When the copolymerizable monomer units are too small in amount, they tend to be inferior in formability, environmental stress cracking resistance, and stress cracking resistance. When the copolymerizable monomer units are too large in amount, the resulting product tends to be inferior in heat resistance, mechanical characteristics, and productivity. The lower limit of the amount of the monomer units derived from monomers copolymerizable with CTFE and TFE is more preferably 0.5 mol %, and the upper limit is more preferably 5 mol %.

FEP is preferable in that it can provide the one particularly excellent in heat resistance. FEP has no particular restriction. However, FEP is preferably a copolymer including a TFE unit in an amount of 70 to 99 mol % and a HFP unit in an amount of 1 to 30 mol %, and more preferably a copolymer including a TFE unit in an amount of 80 to 97 mol % and a HFP unit in an amount of 3 to 20 mol %. When the amount of the TFE unit is less than 70 mol %, the mechanical physical properties tend to be reduced. When the amount exceeds 99 mol %, the melting point becomes too high. Thus, the formability tends to be reduced.

FEP may be a copolymer including TFE, HFP, and a monomer copolymerizable with TFE and HFP. The monomers may be the monomers exemplified as the monomers copolymerizable with CTFE and TFE. As the monomers, mention may be made of perfluoro (alkyl vinyl ether) [PAVE] represented by $CF_2=CF-ORf^6$ (where $R_f^6$ represents a perfluoroalkyl group having 1 to 5 carbon atoms), a vinyl monomer represented by $CZ^3Z^4=CZ^5(CF_2)_nZ^6$ (where $Z^3$, $Z^4$, and $Z^5$ are the same or different, and each represent a hydrogen atom or a fluorine atom, $Z^6$ represents a hydrogen atom, a fluorine atom, or a chlorine atom, and n represents an integer of 2 to 10), an alkyl perfluorovinyl ether derivative represented by $CF_2=CF-OCH_2-Rf^7$ (where $Rf^7$ represents a perfluoroalkyl group having 1 to 5 carbon atoms), and the like. Out of these, it is preferably PAVE. The PAVE and the alkyl perfluorovinyl ether derivative are the same as those exemplified as the monomers copolymerizable with CTFE and TFE.

The FEP preferably includes monomer units derived from monomers copolymerizable with TFE and HFP in an amount of 0.1 to 10 mol %, and a TFE unit and a HFP unit in a total amount of 90 to 99.9 mol %. When the amount of the copolymerizable monomer units is less than 0.1 mol %, the resulting product tends to be inferior in formability, environmental stress cracking resistance, and stress cracking resistance.

When the amount exceeds 10 mol %, the resulting product tends to be inferior in heat resistance, mechanical characteristics, productivity, and the like.

PFA is preferable in that it can provide the one particularly excellent in heat resistance. PFA has no particular restriction. However, PFA is preferably a copolymer including a TFE unit in an amount of 70 to 99 mol % and a PAVE unit in an amount of 1 to 30 mol %, and more preferably a copolymer including a TFE unit in an amount of 80 to 98.5 mol % and a PAVE unit in an amount of 1.5 to 20 mol %. When the amount of the TFE unit is less than 70 mol %, the mechanical physical properties tend to be reduced. When the amount exceeds 99 mol %, the melting point becomes too high. Thus, the formability tends to be reduced.

As the PAVE, the foregoing ones may be mentioned. Out of these, it is more preferably at least one selected from the group consisting of PMVE, PEVE, and PPVE, and further preferably PMVE.

The PFA may be a copolymer including TFE, PAVE, and a monomer copolymerizable with TFE and PAVE. The monomers may be the monomers exemplified as the monomers copolymerizable with CTFE and TFE. As the monomers, mention may be made of HFP, a vinyl monomer represented by $CZ^3Z^4=CZ^5(CF_2)_nZ^6$ (where $Z^3$, $Z^4$, and $Z^5$ are the same or different, and each represent a hydrogen atom or a fluorine atom, $Z^6$ represent a hydrogen atom, a fluorine atom, or a chlorine atom, and n represent an integer of 2 to 10), an alkyl perfluorovinyl ether derivative represented by $CF_2=CF-OCH_2-Rf^7$ (where $Rf^7$ represents a perfluoroalkyl group having 1 to 5 carbon atoms), and the like. The alkyl perfluorovinyl ether derivatives are the same as those exemplified as the monomers copolymerizable with CTFE and TFE.

The PFA preferably includes monomer units derived from monomers copolymerizable with TFE and PAVE in an amount of 0.1 to 10 mol %, and a TFE unit and a PAVE unit in a total amount of 90 to 99.9 mol %. When the amount of the copolymerizable monomer units is less than 0.1 mol %, the resulting product tends to be inferior in formability, environmental stress cracking resistance, and stress cracking resistance. When the amount exceeds 10 mol %, the resulting product tends to be inferior in heat resistance, mechanical characteristics, productivity, and the like.

The ETFE is preferable in that it improves the dynamic physical properties and the like. The content mole ratio of the TFE unit to the ethylene unit is preferably 20:80 to 90:10, more preferably 37:63 to 85:15, and further preferably 38:62 to 80:20.

The ETFE may be a copolymer including TFE, ethylene, and a copolymer including monomers copolymerizable with TFE and ethylene. As the copolymerizable monomers, mention may be made of the monomers represented by the following formulae $CH_2=CZ^7R_f^3$, $CF_2=CFR_f^3$, $CF_2=CFOR_f^3$, and $CH_2=C(R_f^3)_2$ (where $Z^7$ represents a hydrogen atom or a fluorine atom, and $R_f^3$ represents a fluoroalkyl group which may contain ether-linkable oxygen atom). Out of these, fluorinated vinyl monomers represented by $CF_2=CFR_f^3$, $CF_2=CFOR_f^3$ and $CH_2=CZ^7R_f^3$ are preferable. More preferred are HFP, perfluoro(alkyl vinyl ether) [PAVE] represented by $CF_2=CF-OR_f^4$ (where $R_f^4$ represents a perfluoroalkyl group having 1 to 5 carbon atoms), and fluorinated vinyl monomer represented by $CH_2=CZ^7R_f^3$ where $R_f^3$ is a fluoroalkyl group having 1 to 8 carbon atoms.

Specific examples of the fluorinated vinyl monomers represented by the foregoing formulae may include 1,1-dihydroperfluoropropene-1,1,1-dihydroperfluorobutene-1, 1,1,5-trihydroperfluoropentene-1, 1,1,7-trihydroperfluoroheptene-1, 1,1,2-trihydroperfluorohexene-1, 1,1,2-trihydroperfluorooctene-1, 2,2,3,3,4,4,5,5-octafluoropentyl vinyl ether, perfluoro(methyl vinyl ether), perfluoro(propyl vinyl ether), hexafluoropropene, perfluorobutene-1, 3,3,3-trifluoro-2-(trifluoromethyl)propene-1, and 2,3,3,4,4,5,5-heptafluoro-1-pentene ($CH_2=CFCF_2CF_2CF_2H$).

Further, the monomers copolymerizable with TFE and ethylene may be the aliphatic unsaturated carboxylic acids such as itaconic acid and itaconic anhydride.

The monomers copolymerizable with TFT and ethylene are in an amount of preferably 0.1 to 10 mol %, more preferably 0.1 to 5 mol %, and in particular preferably 0.2 to 4 mol % based on the amount of the fluorinated polymers.

The fluororesin is more preferably at least one fluororesin selected from the group consisting of ETFE, PCTFE, EFEP, FEP, and PVdF. For the PMMA conventionally used as a hologram material, the total light transmittance is 90% or less, and particularly, the light absorption on the low wavelength side is large. The ETFE, PCTFE, EFEP, FEP, and PVdF are highly optically transparent materials, and further high in thin film property. Therefore, they suppress the absorption/reflection of light, which can improve the focusing efficiency.

It is also one of preferable modes that the fluororesin is a perhalopolymer. Use of the perhalopolymer results in those excellent in chemical resistance and the like. The perhalopolymer is a polymer in which halogen atoms are bonded to all the carbon atoms forming the main chain of the polymer. The perhalopolymer is preferably at least one selected from the group consisting of the CTFE/TFE copolymer, FEP, and PFA.

The content of respective monomers of the copolymer can be calculated by appropriately combining NMR, FT-IR, elementary analysis, and X-ray fluorescence analysis according to the kind of the monomers.

In the present invention, the fluororesin has no particular restriction, but preferably has a melting point of 160 to 270° C. The molecular weight of the fluororesin is preferably within such a range as to allow the resulting light-concentrating film to express the demanded mechanical characteristics and the like. For example, with the melt flow rate [MFR] as the index of the molecular weight, the MFR at a given temperature within the range of about 230 to 350° C. which is the forming temperature range of the fluororesin in general is preferably 0.5 to 100 g/10 min.

In the present description, the melting point of each resin is determined as the temperature corresponding to the maximum value in the fusion heat curve at heating at a rate of 10° C./min using a DSC device (manufactured by SEIKO Co.). The MFR is determined by measuring the weight (g) of the polymer flowing out per unit time (10 min) from a nozzle with a diameter of 2 mm and a length of 8 mm at each temperature and under a load of 5 kg using a melt indexer (manufactured by Toyo Seiki Seisaku-Sho Ltd.).

The fluororesin can be obtained by a conventionally known polymerization method such as suspension polymerization, solution polymerization, emulsion polymerization, or block polymerization. In the polymerization, various conditions such as temperature and pressure, and a polymerization initiator and other additives can be appropriately set according to the composition and amount of the desirable fluororesin.

(Illustration of Organic Materials)

Below, the organic materials usable for the light-concentrating film of the present invention will be further described. As the organic materials, there can also be used, other than the thermoplastic resins, polymer materials such as curable resins as the coating layers onto the resins and the like, organic/inorganic nanocomposite materials for use as sol/gel materials, and the like.

The curable resins for use as the coating layers onto the resins including thermoplastic resins and the like are each preferably used as a coating onto the base material, or a paint for forming a coating film as the resin simple substance. Namely, when the curable resin is used as a paint, the following procedures are acceptable: the curable resin is applied to the base material, and is cured, then, it is peeled off from the base material to be formed into a film: and if possible, it is processed into the light-concentrating film while being disposed on the base material.

Below, the organic materials will be described.

(Weather Resistant Organic Material)

The organic material forming the light-concentrating film of the present invention has no particular restriction. However, it is preferably a weather resistant organic material. As the weather resistant organic materials, other than the thermoplastic resins, mention may be made of polymer materials such as curable resins and the like as the coating layers onto the resins and the like. The weather resistant organic material is preferably an organic material including a fluororesin. As the organic materials including fluororesins, mention may be made of organic materials including fluororesins and the like, and for example, preferred are organic materials including thermoplastic fluororesins, organic materials including at least one compound selected from the group consisting of (I) fluoroolefin copolymers having a hydroxyl group and/or a carboxyl group, (V) fluorine silicone resins, (VI) homopolymers or copolymers of vinylidene fluoride not having a functional group, and (VII) fluororesins not having a functional group, or at least one organic material selected from the group consisting of the following curable resin compositions (VIII) and the following curable resin compositions (IX).

The thermoplastic fluororesin is preferable in terms of hydrolysis resistance. The organic materials or curable resin compositions including the compounds represented by the (I), (V), (VI), (VII), (VIII), and (IX) are preferable in terms of light resistance. The weather resistant organic material is preferably solvent-soluble.

As the weather resistant organic materials, other than the organic materials including the foregoing compounds, mention may also be made of organic materials including (II) acrylic lacquer resins, (III) acrylic polyol resins, (IV) acrylic silicon resins, and the like. However, from the viewpoint of the track record of use thereof, they are also preferably organic materials including at least one compound selected from the group consisting of (I) fluoroolefin copolymers having a hydroxyl group and/or a carboxyl group, and (III) acrylic polyol resins.

As the fluoroolefin copolymers (I) having a hydroxyl group and/or a carboxyl group, mention may be made of those as described in respective publications such as JP-B S60-21686, JP-A H3-121107, JP-A H4-279612, JP-A H4-28707, and JP-A H2-232221. The number-average molecular weight (by GPC) of the copolymer is 1000 to 100000, and preferably 1500 to 30000. When the molecular weight is less than 1000, the curability and the weather resistance tend to be insufficient. When the molecular weight exceeds 100000, problems tend to occur in workability and coatability.

The hydroxyl value of the fluoroolefin copolymers having a hydroxyl group and/or a carboxyl group is 0 to 200 (mgKOH/g), and preferably 0 to 150 (mgKOH/g). When the hydroxyl group is reduced, curing defects tend to occur. When the hydroxyl value exceeds 200 (mgKOH/g), a problem tends to occur in flexibility.

The acid value of the fluoroolefin copolymers having a hydroxyl group and/or a carboxyl group is 0 to 200 (mgKOH/g), and further preferably 0 to 100 (mgKOH/g). When the acid value is increased, a problem tends to occur in flexibility.

Incidentally, as one of the fluoroolefin copolymers having a hydroxyl group and/or a carboxyl group, a tetrafluoroethylene copolymer can also be used from the viewpoints of the contamination adhesion resistance, the decontaminability, and the rust resistance.

As the fluoroolefin copolymers having a hydroxyl group and/or a carboxyl group, mention may be made of commercially available products such as ZEFFLE (registered trademark) manufactured by Daikin Industries, Ltd., LUMIFLON (registered trademark) manufactured by ASAHI GLASS Co., Ltd., CEFRAL COAT (registered trademark) manufactured by CENTRAL GLASS Co., Ltd., FLUONATE (registered trademark) manufactured by Dainippon Ink and Chemicals, Incorporated, and ZAFLON (registered trademark) manufactured by TOAGOSEI Co., Ltd.

As the acrylic polyol resins (III), for example, mention may be made of polymers of (a) hydroxyl group-containing ethylenically unsaturated monomers such as hydroxyl group-containing (meth)acrylic acid ester, hydroxy vinyl ether, and allyl alcohol, and (b) no hydroxyl group-containing unsaturated monomers such as olefins not containing a hydroxyl group, vinyl ether, allyl ether, vinyl ester, propenyl ester, (meth)acrylic acid ester, vinyl aromatic compound, (meth)acrylonitrile, carboxyl group-containing unsaturated monomers, epoxy group-containing unsaturated monomers, and amino group-containing unsaturated monomers. The acrylic polyol resin may have at least one selected from the group consisting of a hydroxyl group, a carboxyl group, an epoxy group, and an amino group.

The hydroxyl value of the acrylic polyol resin (III) is 0 to 200 (mgKOH/g), and preferably 0 to 100(mgKOH/g). When the hydroxyl value is increased, a problem tends to occur in flexibility.

The acid value of the acrylic polyol resin (III) is 0 to 200 (mgKOH/g), and further preferably 0 to 100 (mgKOH/g). When the acid value is increased, a problem tends to occur in flexibility.

As the acrylic lacquer resins (II), for example, mention may be made of those which are resins using monomers for use in acrylic polyol resins as raw materials, and have a hydroxyl value of zero and an acid value of 0 to 10.

As the acrylic polyol resins (III) or the acrylic lacquer resin (II), there can be used commercially available products such as DYANAL (registered trademark) manufactured by MITSUBISHI RAYON CO., LTD., ACRYDICK (registered trademark) manufactured by Dainippon Ink and Chemicals, Incorporated, HITALOID (registered trademark) manufactured by Hitachi Chemical Co., Ltd., and OLESTER (registered trademark) manufactured by Mitsui Toatsu Chemicals Inc.

As the acrylic silicon resin (IV), for example, mention may be made of the one produced by copolymerizing an acrylic silicon monomer having at least one silane group and a radical polymerizable unsaturated group per molecule with the hydroxyl group-containing ethylenically unsaturated monomers (a) and/or the no hydroxyl group-containing unsaturated monomers (b). The acrylic silicon resin (IV) may have a hydrolyzable silyl group, a hydroxyl group, and an epoxy group.

As the acrylic silicon resins (IV), there can be used commercially available products such as Zemlac (registered trademark) manufactured by KANEKA CORPORATION and Clearmer (registered trademark) manufactured by Sanyo Chemical Industries, Ltd.

Further, an organometallic compound having a hydrolyzable leaving group, an oligomer thereof and/or a cooligomer of two or more of the organometallic compounds are added to the weather resistant organic material. As a result, the resulting mixture can be used as a surface-hydrophilized resin.

The organometallic compound is preferably an organometallic compound represented by the following general formula (1):

$$Z^8{}_e M(OR^{22})_d R^{23}{}_f \qquad (1)$$

[where d is an integer of 0, or 1 to 6, e is an integer of 0, or 1 to 5, f is an integer of 0, or 1 to 6 (provided that d+e+f≥3, and that d and f are not 0 at the same time), $Z^8$'s are the same or different, and each is a monovalent organic group having 1 to 5000 carbon atoms, which may contain an oxygen atom, a nitrogen atom, a fluorine atom, and/or a chlorine atom, or a hydrogen atom, M is a metal atom having at least trivalent valence, $R^{22}$'s are the same or different, and each is a monovalent organic group having 1 to 1000 carbon atoms, which may contain an oxygen atom, a nitrogen atom, a fluorine atom, and/or a chlorine atom, a siloxane residue, or a hydrogen atom, and $R^{23}$'s are the same or different, and each is an organic group having 1 to 20 carbon atoms which have chelation ability, and may contain an oxygen atom, a nitrogen atom, a fluorine atom, and/or a chlorine atom]. Particularly preferred is a fluorinated organometallic compound in which at least one of $R^{22}$ or $R^{23}$ is a fluorinated group.

Such organometallic compounds are preferably the compounds represented by the general formula (1). The organometallic compounds, oligomers thereof, or cooligomers of two or more thereof are those described in WO 97/11130 A1. However, the organometallic compounds represented by the following formula (2):

[CHEMICAL 1]

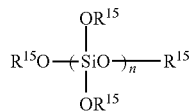

(2)

(where n is an integer of 1 to 20, all of $R^{15}$'s are different or at least two thereof are the same, and each is a monovalent organic group having 1 to 1000 carbon atoms, and may contain an oxygen atom, a nitrogen atom, and/or a silicon atom, and a part or the whole of the hydrogen atoms of the organic groups may be substituted with a fluorine atom, or a fluorine atom and a chlorine atom) excluded in the pamphlet are usable in the present invention.

The organometallic compounds have an action of hydrophilizing the surface of the coating film, and more preferable substituents or molecular weights may be selected and used according to the objective functions and the intended use.

Below, first, a description will be given to a preferred embodiment of the organometallic compounds represented by the general formula (1) in the present invention.

The d in the general formula (1) is an integer of 0, or 1 to 6, and preferably an integer of 2 to 4 from the viewpoints of the surface concentratability, the hydrolyzability, and the leaving ability.

The e in the general formula (1) is an integer of 0, or 1 to 5, and preferably an integer of 0 to 1 from the viewpoints of the surface concentratability and the hydrophilicity.

The f in the general formula (1) is an integer of 0, or 1 to 6, and preferably an integer of 0 to 3 from the viewpoints of the surface concentratability, the hydrolyzability, and the leaving ability.

Incidentally, the total amount of d, e and, f is the amount determined by the valence of the metal atom M. However, in the general formula (1), any one of $OR^{22}$ or $R^{23}$ is necessary for the contamination adhesion resistance, the surface concentratability, and the hydrolyzability. Therefore, d and f are not 0 at the same time, and the total amount of d, e, and f is at least 3.

In the general formula (1), $Z^8$ may be a hydrogen atom, and further, is preferably, for example, a monovalent organic group having 1 to 5000 carbon atoms, which may contain an oxygen atom, a nitrogen atom, a fluorine atom, and/or a chlorine atom as mentioned in the following (1) to (3).

(1) As the organic groups $Z^8$, mention may be made of, for example, $H(CH_2)_p$, $(CH_3)_2CH$, $H(CH_2)_pC=O$, $F(CF_2)_q(CH_2)_p$, $(CF_3)_2CH$, $H(CF_2)_q(CH_2)_p$ (where p is an integer of 0, or 1 to 6, q is an integer of 1 to 10, and a part of fluorine atoms may be substituted with a chlorine atom). The organic groups may be a straight-chain or a branched chain.

Specific examples thereof may include $CH_3$, $CH_3CH_2$, $CH_3CH_2CH_2$, $(CH_3)_2CH$, $CF_3CH_2$, $CF_3CF_2CH_2$, $(CF_3)_2CH$, $F(CF_2)_4CH_2CH_2F(CF_2)_8CH_2CH_2$, and $H(CF_2)_4CH_2$. From the viewpoints of the surface concentratability, the hydrolyzability, and the leaving ability, $CF_3CF_2CH_2$ and $(CF_3)_2CH$ are preferable.

(2) Further, as the organic groups $Z^8$, mention may be made of organic groups having functional groups such as $NH_2$, a secondary amino group, a tertiary amino group, OH, NCO, $CO_2H$, $CO_2Na$, $CO_2K$, $SO_3H$, $SO_2Na$, $SO_3K$, an epoxy group, and an oxyethylene group ($CH_2CH_2O$), and the like.

Specific examples thereof may include $H_2N(CH_2)_3$, $OCN(CH_2)_3$, $CH_3O(CH_2CH_2O)(CH_2)_3$, $CH_3O(CH_2CH_2O)_5(CH_2)_3$, $CH_3O(CH_2CH_2O)_{10}(CH_2)_3$, and a functional group represented by the following formula:

[CHEMICAL 2]

$CH_2CHCH_2O(CH_2)_3$

From the viewpoints of the hydrophilicity, the compatibility, and the adhesion, $OCN(CH_2)_3$ and $CH_3O(CH_2CH_2O)_5(CH_2)_3$ are preferable.

(3) Further, as the organic groups $Z^8$, mention may be made of polymerizable organic groups which may contain, for example, an oxygen atom, a nitrogen atom, a fluorine atom, a chlorine atom, and a silicon atom.

The specific examples thereof may include $CH_2=C(CH_3)CO_2(CH_2)_3$, $CH_2=CH$, $CH_2=CHCH_2$, $CH_2=CHO(CH_2)_3$, $CH_2=CHOCO(CH_2)_3$, $CH_2=CHC_6H_4$, and $CH_2=CHCO_2(CH_2)_3$. From the viewpoint of polymerizability and ease of availability, $CH_2=C(CH_3)CO_2(CH_2)_3$ and $CH_2=CHO(CH_2)_3$ are preferable.

Incidentally, in the present invention, also preferred are polymers or copolymers which are obtained by polymerizing or copolymerizing compounds represented by the formula (1), having such polymerizable organic groups, and which have a molecular weight of 2000 to 200000, and preferably 5000 to 20000.

In the general formula (1), $R^{22}$'s are the same or different, and each may contain an oxygen atom, a nitrogen atom, a fluorine atom, and/or a chlorine atom. From the viewpoints of the surface concentratability, the hydrolyzability, and the leaving ability, $R^{22}$ is a monovalent organic group having 1 to 1000 carbon atoms, a siloxane residue, or a hydrogen atom. The number of carbon atoms is preferably 1 to 100, and further preferably 1 to 16.

In the general formula (1), the monovalent organic groups of $R^{22}$'s are preferably, for example, those represented by $H(CH_2)_m$, $(CH_3)_2CH$, $H(CH_2)_mC=O$, $F(CF_2)_n(CH_2)_m$, $(CF_3)_2CH$, $H(CF_2)_n(CH_2)_m$, $F(CF_2)_n(CH_2)_mC=O$, $H(CF_2)_n(CH_2)_mC=O$, $(F(CF_2)_n(CH_2)_m)_2N$, $((CF_3)_2CH)_2N$, $(H(CF_2)_n(CH_2)_m)_2N$, $F(CF_2)_nO(CF(CF_3)CF_2O)_mCF(CF_3)C=O$, $(F(CF_2)_n(CH_2)_m)_2C=N$, $((CF_3)_2CH)_2C=N$, $(H(CF_2)_n(CH_2)_m)_2C=N$, $F(CF_2)_n(CH_2)_mC=ONR^3$, $H(CF_2)_n(CH_2)_mC=ONR^3$, $F(CF_2)_n(CH_2)_mC=CH_2$, $H(CF_2)_n(CH_2)_mC=CH_2$, $F(CF_2)_n(CH_2)_mC=CF_2$, and $H(CF_2)_n(CH_2)_mC=CF_2$ (where m is an integer of 0, or 1 to 6, n is an integer of 1 to 10, $R^3$ represents an alkyl group having 1 to 6 carbon atoms, in which the alkyl group may be a straight-chain or a branched chain).

Specific examples of the organic groups may include $CF_3CH_2$, $CF_3CF_2CH_2$, $CF_3(CF_2)_2CH_2$, $CF_3(CF_2)_3CH_2CH_2$, $(CF_3)_2CH$, $CF_3(CF_2)_7CH_2CH_2$, $H(CF_2)_2CH_2$, $H(CF_2)_3CH_2$, $H(CF_2)_4CH_2$, $CF_3C=O$, $CF_3CF_2C=O$, $CF_3(CF_2)_6C=O$, and $CF_3(CF_2)_7C=O$. From the viewpoints of the surface concentratability, the hydrolyzability, and the leaving ability, $CF_3CH_2$, $CF_3CF_2CH_2$, $CF_3(CF_2)_2CH_2$, $CF_3(CF_2)_3CH_2CH_2$, $CF_3C=O$, and $CF_3CF_2C=O$ are preferable, and $CF_3CH_2$ and $CF_3CF_2CH_2$ are further preferable.

In the general formula (1), examples of the siloxane residue of $R^{22}$'s may include $(Si(OR^{22})_2O)_nR^{22}$ (where $R^{22}$ is the same as the monovalent organic group of the $R^{22}$'s described above).

In the general formula (1), $R^{23}$'s may be the same or different, and are each an organic group which may contain a fluorine atom and/or a chlorine atom, and has a chelating ability, and has 1 to 20 carbon atoms, and preferably 2 to 10 carbon atoms from the viewpoints of the surface concentratability, the hydrolyzability, and the leaving ability.

In the present invention, use of the organometallic compound to which such an organic group having a chelating ability is bonded results in more excellent storage stability, reactivity, solubility, and compatibility.

As the compounds which can become such compounds having a chelating ability, preferred are, for example, β-diketones such as 2,4-pentanedion and 2,4-heptanedion, ketoesters such as methyl acetoacetate, ethyl acetoacetate, and butyl acetoacetate, hydroxycarboxylic acids such as lactic acid, methyl lactate, ethyl lactate, lactic acid ammonium salt, salicylic acid, methyl salicylate, ethyl salicylate, malic acid, ethyl malate, tartaric acid, and ethyl tartrate, or esters or salts thereof, ketoalcohols such as 4-hydroxy-4-methyl-2-pentanone, 4-hydroxy-2-pentanone, 4-hydroxy-2-heptanone, and 4-hydroxy-4-methyl-2-heptanone, amino alcohols such as monoethanolamine, diethanolamine, triethanolamine, N-methyl monoethanolamine, N-ethyl monoethanolamine, N,N-dimethyl ethanolamine, and N,N-diethyl ethanolamine, and enolic active hydrogen compounds such as diethyl malonate, methylolmelamine, methylol urea, and methylolacrylamide. Further preferred are compounds produced by substituting the whole or a part of the hydrogen atoms thereof with a fluorine atom and/or a chlorine atom, and the like from the viewpoint of the surface concentratability.

In the general formula (1), examples of the metal atom M may include B, Al, Ga, In, Tl, Sc, Y, La, Ac, Si, Ge, Sn, Pb, Ti, Zr, Hf, As, Sb, Bi, V, Nb, Ta, Te, Po, Cr, Mo, W, At, Mn, Tc, Re, Fe, Co, Ni, Ru, Rh, Pd, Os, Ir, and Pt. From the viewpoints of ease of synthesis and availability, Al, Ti, B, Zr, or Si is preferred, and Si is particularly preferred.

Further, as the oligomers or cooligomers in the present invention, mention may be made of straight-chain, branched-chain, cyclic, three-dimensional, or other oligomers or cooligomers.

In the present invention, the degree of polymerization of the oligomer or the cooligomer is preferably 2 to 100, and further preferably 4 to 20. When the degree of polymerization is reduced, the oligomer or the cooligomer tends to be reduced in boiling point. Accordingly, the oligomer or the cooligomer becomes more likely to volatilize during coating, and becomes less likely to be incorporated. When the degree of polymerization exceeds 100, control of the degree of polymerization becomes difficult during synthesis, or the viscosity of the oligomer or the cooligomer tends to increase. Thus, the oligomer or the cooligomer tends to be inferior in workability. However, when the oligomer or the cooligomer is represented by the general formula (1) in which d is 4, e and f are each 0, and, M is Si, and has a fluorine atom, the degree of polymerization thereof is preferably more than 4 and 30 or less from the viewpoints of the coating film outward appearance, the sag resistance, and the alkali resistance.

To the weather resistant organic material, an organometallic compound having a hydrolyzable leaving group, an oligomer thereof, and/or cooligomers of two or more of the organometallic compounds are added. To the resulting hydrophilized resin, a curing agent can be added.

Examples of the curing agent may include isocyanate compounds, block isocyanate compounds, melamine resins, dibasic acids, non-hydrolyzable group-containing silane compounds, epoxy resins, or acid anhydrides. From the viewpoints of the weather resistance and the acid rain resistance, isocyanates, block isocyanates, and epoxy resins are preferable.

Examples of the isocyanate compounds and the block isocyanate compounds may include, but are not limited to, 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethyl hexamethylene diisocyanate, hexamethylene diisocyanate, n-pentane-1,4-diisocyanate, trimers thereof, adduct forms thereof, biuret forms thereof, polymers thereof having two or more isocyanate groups, and further blocked isocyanates.

The mixing ratio of the isocyanate and the weather resistant organic material is preferably 0.5 to 5.0, and more preferably 0.8 to 1.2 by NCO/OH (mole ratio). Further, when the isocyanate is of a moisture-curable type, the ratio is preferably 1.1 to 1.5.

Examples of the melamine resins may include, but are not limited to, other than melamine resins, methylolated melamine resins obtained by methylolating melamine, alkyl etherified melamine resins obtained by etherifying methylolated melamines with alcohols such as methanol, ethanol, and butanol.

As the epoxy compounds, mention may be made of, for example, the compounds represented by the following formulae:

[CHEMICAL 3]

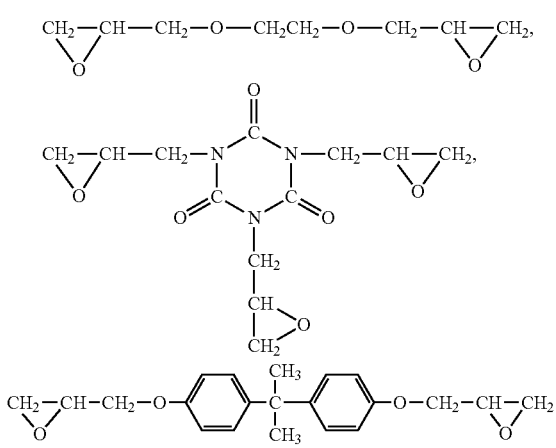

However, these are not exclusive.

Examples of the acid anhydride may include, but are not limited to, phthalic anhydride, trimellitic anhydride, pyromellitic anhydride, 1,2-cyclohexyl dicarboxylic acid anhydride, succinic anhydride, and maleic anhydride.

Further, dibasic acids such as fumaric acid, succinic acid, adipic acid, azelaic acid, sebacic acid, dodecanedioic acid, and 1,2-cyclohexyl dicarboxylic acid are also used as curing agents.

Examples of the curing catalyst may include organotin compounds, organic acidic phosphoric acid esters, organic titanate compounds, reaction products of acidic phosphoric acid esters and amines, saturated or unsaturated polyhydric carboxylic acids or acid anhydrides thereof, organic sulfonic acids, amine type compounds, aluminum chelate compounds, titanium chelate compounds, and zirconium chelate compounds.

Specific examples of the organotin compounds may include dibutyltin dilaurate, dibutyltin maleate, dioctyltin maleate, and dibutyltin diacetate.

As specific examples of the organic acidic phosphoric acid esters, the compounds represented by the following formulae:

[CHEMICAL 4]

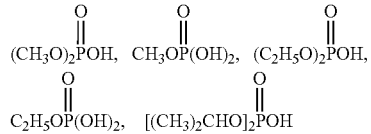

may be mentioned.

Examples of the organic titanate compounds may include titanium acid esters such as tetrabutyl titanate, tetraisopropyl titanate, and triethanolamine titanate.

Further, specific examples of the amine type compounds may include amine type compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylene diamine, triethylene diamine, guanidine, diphenyl guanidine, 2,4,6-tris(dimethylaminomethyl)phenol, morpholine, N-methylmorpholine, and 1,8-diazabicyclo(5.4.0)undecene-7(DBU), and salts thereof with carboxylic acid and the like, low-molecular-weight polyamide resins resulting from excess polyamines and polybasic acids, and reaction products of excess polyamines and epoxy compounds.

Specific examples of the chelate compound may include aluminum tris(ethyl acetoacetate), aluminum tris(acetyl acetonate), zirconium tetrakis (acetyl acetonate), and diisopropoxy/bis(ethyl acetoacetate)titanate.

As the (VII) fluororesins not having a functional group, homopolymers, copolymers, and the like of vinylidene fluoride described in respective publications such as JP-B S43-10363, JP-A H3-28206 and JP-A H4-189879 can be used, and can also be blended with the resins having the functional groups. Whereas, when resins having no functional group are used, the curing agent or the curing catalyst is not necessarily required to be used.

Further, as the weather resistant organic materials, other than these, the following curable resin compositions (VIII) can also be used. The curable resin composition (VIII) contains (A) a reaction product of hydroxyl group-containing fluorinated copolymer containing a fluoroolefin unit and a hydroxyl group-containing radical-polymerizable unsaturated monomer unit (A-1), and an isocyanate group-containing unsaturated compound having one isocyanate group and at least one radical-polymerizable unsaturated group (A-2), and (B) an acrylic monomer.

As the fluoroolefin units in the hydroxyl group-containing fluorinated copolymer (A-1), mention may be made of one, or two or more of a tetrafluoroethylene (TFE) unit, a chlorotrifluoroethylene (CTFE) unit, a vinyl fluoride (VF) unit, a vinylidene fluoride (VdF) unit, a hexafluoropropylene (HFP) unit, a trifluoroethylene (TrFE) unit, a perfluoro(alkyl vinyl ether) (PAVE) unit, and the like. As the PAVE units, mention may be made of a perfluoromethyl vinyl ether unit and a perfluoropropyl vinyl ether unit.

As the combinations of two or more units including a TFE unit, mention may be made of a TFE/HFP unit, a TFE/PAVE unit, a TFE/ethylene unit, a TFE/vinyl ether unit, a TFE/vinyl ester unit, a TFE/vinyl ester/vinyl ether unit, a TFE/vinyl ether/allyl ether unit, and the like. Out of these, from the viewpoint of excellent mixing into ethylenically unsaturated group-containing monomers, preferred are a TFE/ethylene unit, a TFE/vinyl ether unit, a TFE/vinyl ester unit, a TFE/vinyl ester/vinyl ether unit, a TFE/vinyl ether/allyl ether unit, and the like.

As the combinations of two or more units including a CTFE unit, mention may be made of a CTFE/HFP unit, a CTFE/PAVE unit, a CTFE/ethylene unit, a CTFE/vinyl ether unit, a CTFE/vinyl ester unit, a CTFE/vinyl ester/vinyl ether unit, a CTFE/vinyl ether/allyl ether, and the like. Out of these, from the viewpoint of excellent mixing into ethylenically unsaturated group-containing monomers, preferred are a CTFE/ethylene unit, a CTFE/vinyl ether unit, a CTFE/vinyl ester unit, a CTFE/vinyl ester/vinyl ether unit, a CTFE/vinyl ether/allyl ether unit, and the like.

Similarly, as the combinations of two or more units including a HFP unit, mention may be made of a CTFE/HFP unit, a TFE/HFP unit, a HFP/vinyl ether unit, a HFP/vinyl ester unit, a HFP/vinyl ester/vinyl ether unit, a HFP/vinyl ether/allyl ether unit, and the like. Out of these, from the viewpoint of excellent mixing into ethylenically unsaturated group-containing monomers, preferred are a HFP/vinyl ether unit, a HFP/vinyl ester unit, a HFP/vinyl ester/vinyl ether unit, a HFP/vinyl ether/allyl ether unit, and the like.

As the combinations of two or more units including a VdF unit, mention may be made of a VdF/TFE unit, a VdF/HFP unit, a VdF/TFE/HFP unit, a VdF/CTFE unit, a VdF/TFE/PAVE unit, a VdF/CTFE/TFE unit, a VdF/CTFE/HFP unit, and the like. Out of these, from the viewpoint of excellent mixing into ethylenically unsaturated group-containing monomers, it is preferable that the VdF unit is contained in an amount of 50 mol % or more in the polymer.

Specific examples of the hydroxyl group-containing radical-polymerizable unsaturated monomer unit in the hydroxyl group-containing fluorinated copolymer (A-1) may include hydroxyalkyl vinyl ether and hydroxyalkyl allyl ether represented by the following formula:

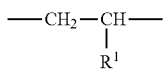

[CHEMICAL 5]

(where, in the formula, $R^1$ is $-OR^2$ or $-CH_2OR^2$ (provided that $R^2$ is an alkyl group having a hydroxyl group)). Examples of $R^2$ are those in which to a straight-chain or branched-chain alkyl group having 1 to 8 carbon atoms, 1 to 3, preferably one hydroxyl group is bonded. Examples thereof may include 2-hydroxyethyl vinyl ether unit, 3-hydroxypropyl vinyl ether unit, 2-hydroxypropyl vinyl ether unit, 2-hydroxy-2-methyl propyl vinyl ether unit, 4-hydroxybutyl vinyl ether unit, 4-hydroxy-2-methylbutyl vinyl ether unit, 5-hydroxy pentyl vinyl ether unit, 6-hydroxy hexyl vinyl ether unit, 2-hydroxyethyl allyl ether unit, 4-hydroxybutyl allyl ether unit, ethylene glycol monoallyl ether unit, diethylene glycol monoallyl ether unit, triethylene glycol monoallyl ether unit, and glycerin monoallyl ether unit. Out of these, particularly, hydroxyalkyl vinyl ether having 3 to 8 carbon atoms, especially, a 4-hydroxybutyl vinyl ether unit or a 2-hydroxyethyl vinyl ether unit is preferable from the viewpoint of easy polymerization.

The hydroxyl group-containing fluorinated copolymer (A-1) preferably further contains a no hydroxyl group-containing non-fluorine vinyl ether unit and/or non-fluorine vinyl ester unit from the viewpoint of enhancing the solubility with acrylic monomers.

Specific examples of the no hydroxyl group-containing non-fluorine vinyl ether unit and/or non-fluorine vinyl ester unit in the hydroxyl group-containing fluorinated copolymer (A-1) may include alkyl vinyl ether and alkyl allyl ether represented by the following formula:

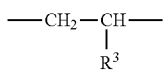

[CHEMICAL 6]

(where in the formula, $R^3$ is $-OR^4$, $-COOR^4$, or $-OCOR^4$ (provided that $R^4$ is an alkyl group)). $R^4$ is, for example, a straight-chain, branched chain, or cyclic alkyl group having 1 to 8 carbon atoms. As examples thereof, for example, preferred are cyclohexyl vinyl ether unit, methyl vinyl ether unit, ethyl vinyl ether unit, propyl vinyl ether unit, n-butyl vinyl ether unit, isobutyl vinyl ether unit, vinyl acetate unit, vinyl propionate unit, vinyl butyrate unit, vinyl isobutyrate unit, vinyl pivalate unit, vinyl caproate unit, vinyl versatate unit, vinyl laurate unit, vinyl stearate unit, and vinyl cyclohexylcarboxylate unit. Further, from the viewpoints of excellent weather resistance, solubility, and inexpensiveness, preferred are vinyl versatate, vinyl laurate, vinyl stearate, vinyl cyclohexylcarboxylate, and vinyl acetate. Out of these, from the viewpoint of the chemical resistance, preferred are non-aromatic type carboxylic acid vinyl esters, particularly, carboxylic acid vinyl esters in which carboxylic acid has 6 or more carbon atoms, and further preferably, carboxylic acid vinyl esters in which carboxylic acid has 9 or more carbon atoms. The upper limit of the number of carbon atoms of carboxylic acid in carboxylic acid vinyl ester is 20 or less, and further preferably 15 or less. As specific example thereof, vinyl versatate is most preferable.

The hydroxyl group-containing fluorinated copolymer (A-1) may contain a carboxyl group-containing monomer unit.

The carboxyl group-containing monomer unit contains a carboxyl group, and does not contain a hydroxyl group and an aromatic group. In this respect, it is different from other units. When the carboxyl group-containing monomer unit is prepared into a curable resin composition, it has an action of improving the dispersibility and the curing reactivity of the hydroxyl group-containing fluorinated copolymer (A-1), and improving the gloss, hardness, adhesion to the base material, and the like of the resulting coating film.

Examples of the carboxyl group-containing monomer unit may include carboxyl group-containing vinyl monomers represented by the following formula:

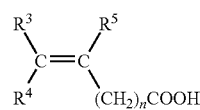

[CHEMICAL 7]

(where in the formula, $R^3$, $R^4$, and $R^5$ are the same or different, and each is a hydrogen atom, an alkyl group, a carboxyl group, or an ester group, and n is 0 or 1), or the following formula:

[CHEMICAL 8]

(where in the formula, $R^6$ and $R^7$ are the same or different, and each is a saturated or unsaturated straight-chain or cyclic alkyl group, n is 0 or 1, and m is 0 or 1).

Specific examples thereof may include one, or two or more of, for example, acrylic acid, methacrylic acid, vinyl acetate, crotonic acid, cinnamic acid, 3-allyloxy propionic acid, itaconic acid, itaconic acid monoester, maleic acid, maleic acid monoester, maleic anhydride, fumaric acid, fumaric acid monoester, vinyl phthalate, and vinyl pyromellitate. Out of these, preferred are crotonic acid, itaconic acid, maleic acid, maleic acid monoester, fumaric acid, fumaric acid monoester, and 3-allyloxy propionic acid with low homopolymerizability.

The lower limit of the ratio of the carboxyl group-containing monomer units is 0.1 mol %, and preferably 0.4 mol %. The upper limit thereof is 2.0 mol %, and preferably 1.5 mol %. A ratio of more than 2.0 mol % is not preferable from the viewpoint of the curing speed of the coating film.

Specific examples of the hydroxyl group-containing fluorinated copolymer (A-1) may include:

[CHEMICAL 9]

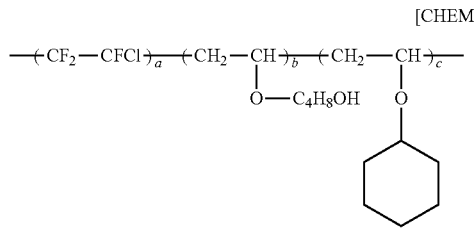

(where in the formula, the ratio of a, b, and c is, by mole ratio, a:b:c=40 to 60:3 to 15:5 to 45);

[CHEMICAL 10]

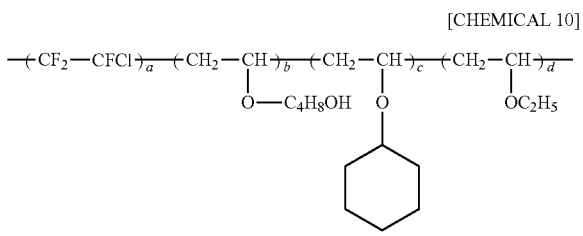

(where in the formula, the ratio of a, b, c, and d is, by mole ratio, a:b:c:d=40 to 60:3 to 15:5 to 45:5 to 45);

[CHEMICAL 11]

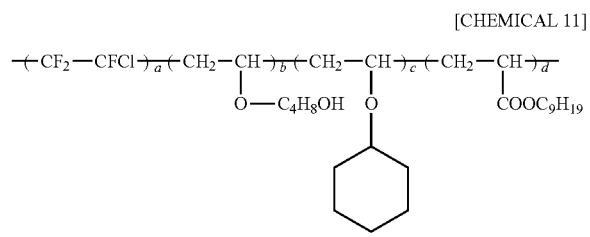

(where in the formula, the ratio of a, b, c and d is, by mole ratio, a:b:c:d=40 to 60:3 to 15:5 to 45:5 to 45);

[CHEMICAL 12]

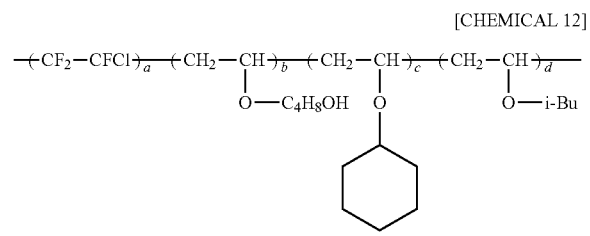

(where in the formula, the ratio of a, b, c and d is, by mole ratio, a:b:c:d=40 to 60:3 to 15:5 to 45:5 to 45, and i-Bu means an isobutyl group); tetrafluoroethylene/vinyl versatate/hydroxybutyl vinyl ether; tetrafluoroethylene/vinyl versatate/hydroxyethyl vinyl ether/tert-butyl vinyl benzoate; tetrafluoroethylene/vinyl versatate/hydroxybutyl vinyl ether/crotonic acid; and tetrafluoroethylene/vinyl versatate/hydroxyethyl vinyl ether/vinyl benzoate/crotonic acid.

As the radical-polymerizable unsaturated groups in the isocyanate group-containing unsaturated compound (A-2), mention may be made of a methacryl group, an acryl group, a 2-fluoroacryl group, and a 2-chloroacryl group. From the viewpoints of the polymerization reactivity, the cost, and the ease of synthesis, a methacryl group and an acryl group are preferable, and especially an acryl group is most preferable.

Examples of the isocyanate group-containing unsaturated compound (A-2) may include alkyl vinyl ether and alkyl allyl ether represented by the following formula:

[CHEMICAL 13]

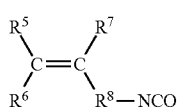

(where in the formula, $R^5$, $R^6$, or $R^7$ may be the same or different, and each is a hydrogen atom, a fluorine atom, a chlorine atom, or an alkyl group having 1 to 4 carbon atoms, and $R^8$ is —COO—$R^9$—, —OCO—$R^9$—, or —O—$R^9$— (provided that $R^9$ is an a alkyl group having 1 to 20 carbon atoms)).

As the isocyanate group-containing unsaturated compound (A-2), 2-isocyanate ethyl acrylate represented by the following formula:

$CH_2$=CHCO—O—$CH_2$—$CH_2$—NCO  [CHEMICAL 14]

and 2-isocyanate ethyl methacrylate represented by the following formula:

[CHEMICAL 15]

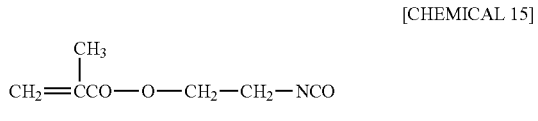

4-isocyanate butyl acrylate, and 4-isocyanate butyl methacrylate may be mentioned.

Further, mention may be made of those having one isocyanate group of the reaction products obtained by allowing unsaturated monoalcohol to react with polyhydric isocyanate. Examples of polyhydric isocyanate may include 2,4-tolylene diisocyanate, 2,6-tolylene diisocyanate, mixed isocyanate of 2,4-tolylene diisocyanate and 2,6-tolylene diisocyanate, P,P'-diphenylmethane diisocyanate, 1,5-naphthylene diisocyanate, paraphenylene diisocyanate, 1,6-hexamethylene diisocyanate, isophorone diisocyanate, and hydrogenated xylylene diisocyanate. Further, as unsaturated monoalcohols, mention may be made of monoalcohols having an acryloyl group or a methacryloyl group such as 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate, and monoalcohols having an allyl group such as allyl alcohol, allyl cellosolve, and trimethylpropane diallyl ether. Out of these, from the viewpoints of the ease of synthesis and the high reactivity, preferred are 2-isocyanate ethyl acrylate or 2-isocyanate ethyl methacrylate.

The reaction product (A) results from urethane bonding between the hydroxyl group in the hydroxyl group-containing fluorinated copolymer (A-1) and the isocyanate group in the isocyanate group-containing unsaturated compound (A-2).

The fluorine content of the reaction product (A) is preferably 2 mass % or more, more preferably 5 mass % or more, and further preferably 10 mass % or more from the viewpoints of the excellent weather resistance, water-repellent/ oil-repellent property, and antifouling property. Further, the fluorine content of the reaction product (A) is preferably 50 mass % or less, further, more preferably 30 mass % or less, and further preferably 25 mass % or less from the viewpoint of the excellent solubility for an acrylic.

The molecular weight of the reaction product (A) is, by number-average molecular weight, preferably 1000 or more, more preferably 2000 or more, and further preferably 3000 or more from the viewpoints of the strength and the surface hardness of the cured product resulting from curing of a curable composition prepared therefrom. Further, the molecular weight of the reaction product (A) is, by number-average molecular weight, preferably 100000 or less from the viewpoint that the viscosity increases, resulting in difficult handling, more preferably 50000 or less from the viewpoint that the solubility for an acrylic is excellent, and further preferably 30000 or less from the viewpoint that the viscosity of the composition is low, resulting in excellent handling.

The acrylic monomer (B) in the curable resin composition (VIII) denotes a monomer having one, or two or more acryloyl groups, methacryloyl groups, 2-fluoroacryloyl groups, or 2-chloroacryloyl groups, and denotes the one different from the isocyanate group-containing unsaturated compound (A-2) having a radical-polymerizable unsaturated group.

The radical-polymerizable unsaturated groups in the acrylic monomer (B) are preferably in a number of one from the viewpoint that the solubility of the hydroxyl group-containing fluorinated copolymer (A-1) is high, and that the viscosity is low; further, preferably in a number of two or more from the viewpoint that the strength of the cured product resulting from curing of a curable composition prepared therefrom is excellent; and further, more preferably in a number of three or more from the viewpoint that the curing speed of the curable composition is excellent.

As the acrylic monomers (B), specifically, mention may be made of: methacrylate monomers such as methyl methacrylate (MMA), methacrylic acid (MA), ethyl methacrylate (EMA), n-butyl methacrylate (nBMA), isobutyl methacrylate (iBMA), 2-ethylhexyl methacrylate, phenyl methacrylate, cyclohexyl methacrylate, 3-(trimethoxysilyl)propyl methacrylate (MSPM), 2-(phenylphosphoryl)ethyl methacrylate (phenyl-P), 2,2-bis(4-methacryloxyphenyl)propane (BP-DMA), 2,2-bis(4-methacryloxyethoxyphenyl)propane (Bis-MEPP), 2,2-bis(4-methacryloxypolyethoxyphenyl)propane (Bis-MPEPP), di(methacryloxyethyl)trimethyl hexamethylene diurethane (UDMA), trimethylolpropane trimethacrylate (TMPT), pentaerythritol triacrylate, pentaerythritol tetraacrylate, dipentaerythritol hexaacrylate, ethylene glycol dimethacrylate (EDMA or 1G), diethylene glycol dimethacrylate (DiEDMA), triethylene glycol dimethacrylate (TriEDMA), 1,4-butanediol dimethacrylate (1,4-BuDMA), 1,3-butanediol dimethacrylate (1,3-BuDMA), and 1,6-hexanediol diacrylate (16 $HZ^6$); and hydroxyl group-containing methacrylate monomers such as 2-hydroxyethyl methacrylate (HEMA), 2-hydroxy-3-(β-naphthoxy)propyl methacrylate (HNPM), N-phenyl-N-(2-hydroxy-3-methacryloxy)propyl glycine (NPG-GMA), and 2,2-bis[4-(2-hydroxy-3-methacryloxypropoxy)phenyl]propane (Bis-GMA), and the like. Further, respective acrylates and respective 2-chloroacrylates corresponding to these can be exemplified.

Further, examples of the fluorinated acrylic monomers may include:
2-fluoroacrylates corresponding to the methacrylate monomers or the hydroxyl group-containing methacrylate monomers,
$CH_2=C(CH_3)COOCH_2CF_3$ (3FMA),
$CH_2=C(CH_3)COOCH_2CF_2CF_2H$ (4FMA),
$CH_2=C(CH_3)COOCH_2CF_2CF_3$ (5FMA)
$CH_2=C(CH_3)COOCH_2CF_2CFHCF_3$ (6FMA)
$CH_2=C(CH_3)COOCH_2(CF_2)_3CF_2H$ (8FMA),
$CH_2=C(CH_3)COOCH_2CH_2(CF_2)_3CF_3$ (9FMA)
$CH_2=C(CH_3)COOCH_2(CF_2)_5CF_2H$ (12FMA)
$CH_2=C(CH_3)COOCH_2CH_2(CF_2)_5CF_3$ (13FMA),
$CH_2=C(CH_3)COOCH_2CH_2(CF_2)_7CF_3$ (17FMA),
$CH_2=C(CH_3)COOCH(CF_3)_2$ (HFIP-MA),
$CH_2=C(CH_3)COOCH_2CCH_3(CF_3)_2$ (6FNP-MA), and
$CH_2=C(CH_3)COOCH_2CF(CF_3)$ $OCF_2CF_2CF_3$ (6FOn1-MA); and respective acrylates, respective 2-fluoroacrylates, and respective 2-chloroacrylates corresponding to these.

Examples of the 2-fluoroacrylate may include:
$CH_2=CFCOOCH_2CF_2CF_2H$ (4FFA),
$CH_2=CFCOOCH_2CF_2CF_3$ (5FFA),
$CH_2=CFCOOCH_2(CF_2)_3CF_2H$ (8FFA),
$CH_2=CFCOOCH_2(CF_2)_5CF_2H$ (12FFA), and
$CH_2=CFCOOCH(CF_3)_2$ (HFIP-FA).

Further, use of an acrylic monomer having a curable functional group provides a cured product excellent in adhesion, chemical resistance, curability, and the like, and hence is preferable. Examples of the acrylic monomer having a curable functional group may include acrylic monomers having a hydroxyl group, a carboxyl group, an epoxy group, an amino group, and the like. Although specific examples thereof correspond to the specific examples mentioned previously, examples thereof may include curable functional group-containing acrylic monomers such as hydroxyethyl (meth)acrylate, 2-hydroxypropyl (meth)acrylate, 2-hydroxyethyl vinyl ether, (meth)acrylic acid, glycidyl (meth)acrylate, 2-aminoethyl (meth)acrylate, and 2-aminopropyl (meth)acrylate.

The foregoing acrylic monomers can be mentioned, and from the viewpoint that the solubilities for the hydroxyl group-containing fluorinated copolymer (A-1), the isocyanate group-containing unsaturated compound (A-2), and the reaction product thereof (A) are excellent, preferred are methyl methacrylate, ethyl methacrylate, methyl acrylate, and ethyl acrylate.

The mass ratio of the reaction product (A) and the acrylic monomer (B) is preferably 95:5 to 5:95, more preferably 80:20 to 20:80, and further preferably 70:30 to 30:70. When the mass ratio of the reaction product (A) and the acrylic monomer (B) deviates from 95:5, and the reaction product (A) increases in mass, the reaction product (A) tends to increase in viscosity, and to become difficult to handle. Whereas, when the mass ratio of the reaction product (A) and the acrylic monomer (B) deviates from 5:95, and the reaction product (A) decreases in mass, the fluorine content is reduced. Accordingly, the cured product resulting from curing of the curable composition tends to be reduced in weather resistance, water-repellent/oil-repellent property, and antifouling property.

For the ratio of the reaction product (A) and the acrylic monomer (B), from another viewpoint, per 100 parts by mass of the reaction product (A), the acrylic monomer (B) is in a ratio of preferably 10 parts by mass or more, more preferably 40 parts by mass or more, and further preferably 60 parts by mass or more.

When the acrylic monomer (B) decreases in amount, it tends to be high in viscosity and to become difficult to handle. Whereas, per 100 parts by mass of the reaction product (A), the acrylic monomer (B) is in a ratio of preferably 1500 parts by mass or less, more preferably 1200 parts by mass or less, and further preferably 1000 parts by mass or less. An increase in amount of the acrylic monomer (B) results in reduction of the fluorine content. Accordingly, the cured product resulting from curing of the curable composition tends to be reduced in weather resistance, water-repellent/oil-repellent property, and antifouling property.

The viscosity at 25° C. of the curable resin composition is preferably 5 mPa·s or more because too low viscosity results in much dripping, which rather reduces the handling property. From the viewpoint that the thin film formability is excellent, the viscosity is more preferably 10 mPa·s or more. From the viewpoint that curing shrinkage during curing is small, the viscosity is further preferably 50 mPa·s or more. Further, the viscosity at 25° C. of the curable resin composition is, from the viewpoint that the handling property is excellent, preferably 100000 mPa·s or less. From the viewpoint that during molding processing, the curable composition spreads therethroughout, the viscosity is more preferably 5000 mPa·s or less. From the viewpoint that when a thin film is formed, levelling (surface smoothness) property is excellent, the viscosity is further preferably 3000 mPa·s or less.

The curable resin composition may further contain a curing agent. The curing agent is a compound which reacts with the curing reactive group of the hydroxyl group-containing fluorinated copolymer (A-1) for crosslinking. For example, there are commonly used isocyanates not having an unsaturated bond, amino resins, acid anhydrides, polyepoxy compounds, and isocyanate group-containing silane compounds.

Specific examples of the isocyanates not having an unsaturated bond may include, but are not limited to: 2,4-tolylene diisocyanate, diphenylmethane-4,4'-diisocyanate, xylylene diisocyanate, isophorone diisocyanate, lysine methyl ester diisocyanate, methylcyclohexyl diisocyanate, trimethyl hexamethylene diisocyanate, hexamethylene diisocyanate, and n-pentane-1,4-diisocyanate or trimers thereof, adduct forms thereof, biuret form thereof, polymers thereof having two, or more isocyanate groups, and further blocked isocyanates.

Specific examples of the amino resins may include, but are not limited to: other than urea resin, melamine resin, benzoguanamine resin, and glycoluril resin, methylolated melamine resin obtained by methylolating melamine, and alkyl etherified melamine resin obtained by etherifying methylolated melamine with alcohols such as methanol, ethanol, and butanol.

Specific examples of the acid anhydrides may include, but are not limited to: phthalic anhydride, pyromellitic anhydride, and mellitic anhydride.

As the polyepoxy compounds and the isocyanate group-containing silane compounds, there can be used, for example, those described in JP-A H2-232250, JP-A H2-232251, and the like. As preferable examples, for example

[CHEMICAL 16]

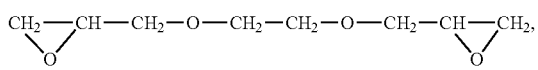

[CHEMICAL 17]

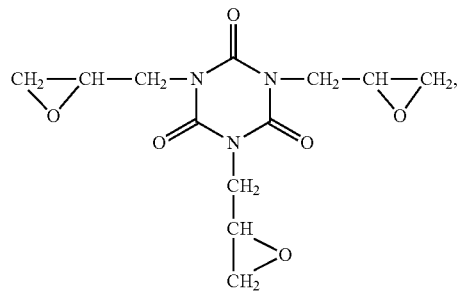

[CHEMICAL 18]

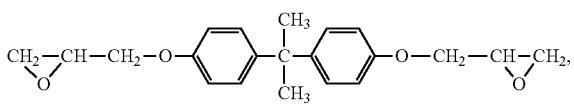

$OCNC_3H_6Si(OC_2H_5)_3$, and $OCNC_2H_4Si(OCH_3)_3$ may be mentioned.

The mixing amount of the curing agent is 0.1 to 5 equivalents, and preferably 0.5 to 1.5 equivalents per equivalent of the chemically curing reactive group in the hydroxyl group-containing fluorinated copolymer (A-1). The composition of the present invention can generally be cured for several minutes to about 10 days at 0 to 200° C.

Further, for curing the curable resin composition, curing is caused by UV irradiation for polymerizing the reaction product (A) and the acrylic monomer (B). For this reason, the curable resin composition may contain therein a photopolymerization initiator. Specific examples of the photopolymerization initiator may include: acetophenone type compounds such as acetophenone, chloroacetophenone, diethoxyacetophenone, hydroxyacetophenone, and α-aminoacetophenone; benzoin type compounds such as benzoin, benzoin methyl ether, benzoin ethyl ether, benzoin isopropyl ether, benzoin isobutyl ether, and benzyldimethyl ketal; benzophenone type compounds such as benzophenone, benzoylbenzoic acid, benzoyl methyl benzoate, 4-phenyl benzophenone, hydroxy benzophenone, hydroxy-propyl benzophenone, acrylated benzophenone, and Michler's ketone; thioxanthones such as thioxanthone, chlorothioxanthone, methyl thioxanthone, diethyl thioxanthone, and dimethyl thioxanthone; and as other compounds, benzyl, α-acyloxime ester, acyl phosphine oxide, glyoxy ester, 3-ketocumarine, 2-ethyl anthraquinone, camphorquinone, and anthraquinone.

Further, if required, known photoinitiator aids such as amines, sulfones, and sulfines may be added.

The curable resin composition does not contain an organic solvent not having a radical reactive group and a fluorine type solvent. This is preferable in that the step of removing the solvent after curing the curable resin composition is unnecessary, and in that there are no adverse effects such as reduction of the heat resistance, reduction of the strength, and cloudiness due to the residual solvents.

The curing catalysts may be used alone, or may be used in combination of two or more thereof. As preferable curing catalysts, mention may be made of organotin compounds and aluminum chelate compounds.

Further, mention may be made of acidic phosphoric acid esters, reaction products of acidic phosphoric acid esters and amines, saturated or unsaturated polyhydric carboxylic acids or acid anhydrides thereof, organic titanate compounds, amine type compounds, lead octylate, and the like.

Specific examples of the organotin compounds may include dibutyltin dilaurate, dibutyltin maleate, dioctyltin maleate, dibutyltin diacetate, dibutyltin phthalate, tin octylate, tin naphthenate, and dibutyltin methoxide.

Further, the acidic phosphoric acid ester is phosphoric acid ester containing the moiety represented by,

[CHEMICAL 19]

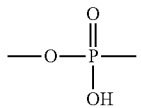

and for example, mention may be made of organic acidic phosphoric acid esters represented by:

[CHEMICAL 20]

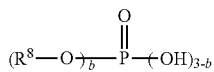

(where b denotes 1 or 2, and $R^8$ denotes an organic residue). Specifically,

[CHEMICAL 21]

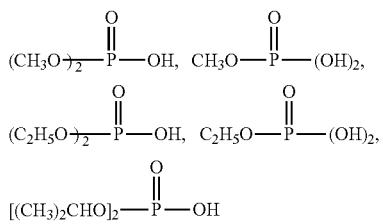

and the like may be mentioned.

Examples of the organic titanate compounds may include titanium acid esters such as tetrabutyl titanate, tetraisopropyl titanate, and triethanolamine titanate.

Further, specific examples of the amine type compounds may include: amine type compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylene diamine, triethylenediamine, guanidine, diphenyl guanidine, 2,4,6-tris(dimethylaminomethyl)phenol, morpholine, N-methylmorpholine, and 1,8-diazabicyclo(5.4.0)undecene-7(DBU), further, salts thereof with carboxylic acid and the like, low-molecular-weight polyamide resins resulting from excess polyamines and polybasic acids, and reaction products of excess polyamines and epoxy compounds.

The curing catalysts may be used alone, or may be used in combination of two or more thereof. The mixing ratio of the curing promoter is preferably $1.0 \times 10^{-6}$ to $1.0 \times 10^{-2}$ parts by mass, and more preferably $5.0 \times 10^{-5}$ to $1.0 \times 10^{-3}$ parts by mass per 100 parts by mass of the copolymer.

The mixing ratio of the weather resistant organic material and the organometallic compound varies according to the purpose and the intended use. Generally, the organometallic compound is in a ratio of 0.1 to 50 parts by weight, and preferably 1 to 30 parts by weight per 100 parts by weight of the weather resistant organic material. When the ratio is less than 0.1 part by weight, the hydrophilization action tends to become insufficient. When the ratio exceeds 50 parts by weight, a defective outward appearance and reduction of the compatibility with resins tend to be caused.

Further, as the weather resistant organic materials, other than these, the following curable resin compositions (IX) can also be used. The curable resin composition (IX) contains (A) a reaction product of a hydroxyl group-containing fluorinated polymer (A-1) containing a radical-polymerizable unsaturated monomer unit containing a fluorine atom and a hydroxyl group, and an isocyanate group-containing unsaturated compound (A-2) having one isocyanate group and at least one radical-polymerizable unsaturated group, and (B) an acrylic monomer.

Specific examples of the hydroxyl group-containing radical-polymerizable unsaturated monomer unit in the hydroxyl group-containing fluorinated copolymer (A-1) may include hydroxyl group-containing fluorinated ethylenic monomers represented by the formula (1):

[CHEMICAL 22]

(where in the formula, $X^1$ and $X^2$ may be the same or different, and each is a fluorine atom or a hydrogen atom; $X^3$ is a fluorine atom, a hydrogen atom, a chlorine atom, a methyl group, or a trifluoromethyl group; $R^1$ is a chain or branched chain alkyl group, fluoroalkyl group, or perfluoroalkyl group having 1 to 30 carbon atoms, and containing at least one or more hydroxyl groups, and may contain, in the chain, an ether bond, an ester bond, or an urethane bond; provided that at least one fluorine atom is contained in any of $X^1$ to $X^3$, and $R^1$). Out of these, hydroxyl group-containing fluorinated ethylenic monomers represented by the formula (II) are more preferable.

[CHEMICAL 23]

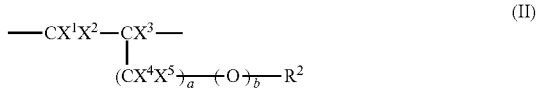

(where in the formula, $X^1$ and $X^2$ may be the same or different, and each is a fluorine atom or a hydrogen atom; $X^3$ is a fluorine atom, a hydrogen atom, a chlorine atom, a methyl group, or a trifluoromethyl group; $X^4$ and $X^5$ may be the same or different, and each is a hydrogen atom, a fluorine atom, a methyl group, or a trifluoromethyl group; a is an integer of 0 to 3; b is 0 or 1; and $R^2$ is a chain or branched chain alkyl group, fluoroalkyl group, or perfluoroalkyl group having 1 to 29 carbon atoms, and containing at least one or more hydroxyl groups, and may contain, in the chain, an ether bond, an ester bond, or an urethane bond; provided that at least one fluorine atom is contained in any of $X^1$ to $X^5$ and $R^2$).

Further preferable hydroxyl group-containing fluorinated ethylenic monomer is represented by the formula (III):

[CHEMICAL 24]

(III)

(where in the formula, $R^3$ is a chain or branched chain alkyl group, fluoroalkyl group, or perfluoroalkyl group having 1 to 29 carbon atoms, and containing at least one or more hydroxyl groups, and may contain, in the chain, an ether bond, an ester bond, or an urethane bond).

Then, the hydroxyl group contained in $R^1$ to $R^3$ will be described. The carbon atoms to each of which a hydroxyl group is directly bonded can be generally classified into three kinds of primary carbons, secondary carbons, and tertiary carbons according to the number of carbon atoms bonded to the carbon atom to which a hydroxyl group is bonded.

First, the primary carbon is that in the case where the number of carbon atoms bonded to the carbon atom to which a hydroxyl group is bonded is one as with R—$CH_2$—OH (where R is an organic group having one or more carbon atoms).

Specifically, as monovalent hydroxyl group-containing organic groups,

[CHEMICAL 25]

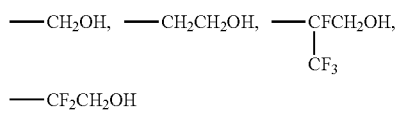

and the like may be mentioned.

Then, the secondary carbon is that in the case where the number of carbon atoms bonded to the carbon to which a hydroxyl group is bonded is 2 as with R—CR'H—OH, (where R and R' are each an organic group having one or more carbon atoms).

Specifically, as the monovalent hydroxyl group-containing organic groups,

[CHEMICAL 26]

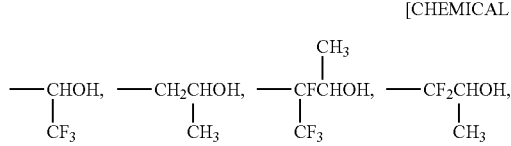

and the like may be mentioned.

Then, the tertiary carbon is that where the number of carbon atoms bonded to the carbon to which a hydroxyl group is bonded is 3 as with R—CR'R"—OH (where R, R', and R" are each an organic group having one or more carbon atoms). Specifically, as the monovalent hydroxyl group-containing organic groups,

[CHEMICAL 27]

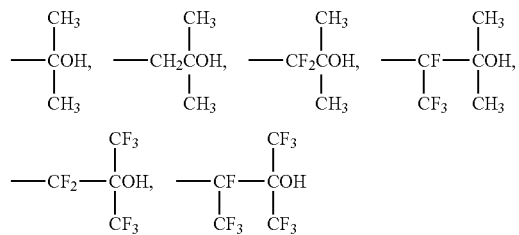

and the like may be mentioned.

Out of these, preferred are, from the viewpoint of steric hindrance, the hydroxyl group bonded to the primary and secondary carbons, and from the viewpoint of the reactivity, preferably, the hydroxyl group bonded to the primary carbon.

Then, with a monovalent hydroxyl group-containing organic group having 1 to 10 carbon atoms and having a hydroxyl group bonded to the primary to tertiary carbons as described above as $Y^1$, specific structures of $R^1$ to $R^3$ will be described using Y. Herein, Y represents $Y^1$ or simply a hydroxyl group.

[CHEMICAL 28]

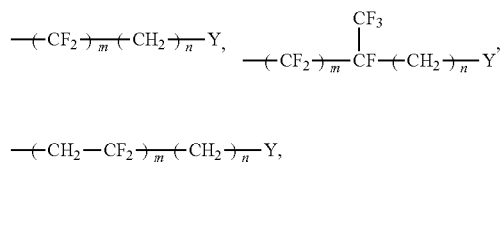

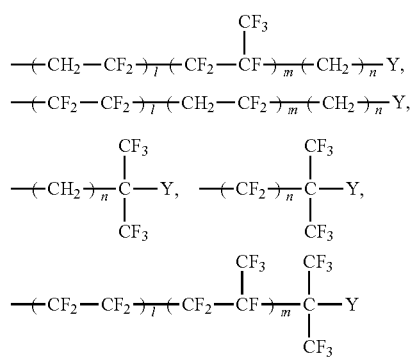

(where l, m and n are each an integer, l is 1 to 10, m is 1 to 10, and n is 1 to 5)

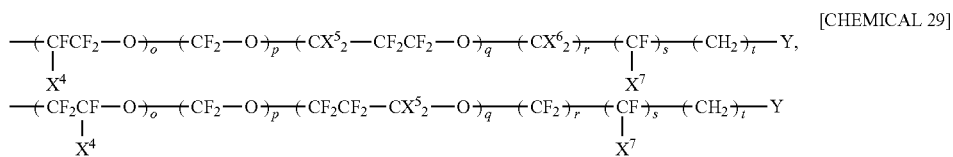
[CHEMICAL 29]
(where in the formula, $X^4$ and $X^7$ are each F or $CF_3$, $X^5$ and $X^6$ are each H or F, $o+p+q$ is 1 to 10; r is 0 or 1; and s and t are each 0 or 1), and the like may be mentioned.
As specific examples of the formula (III),
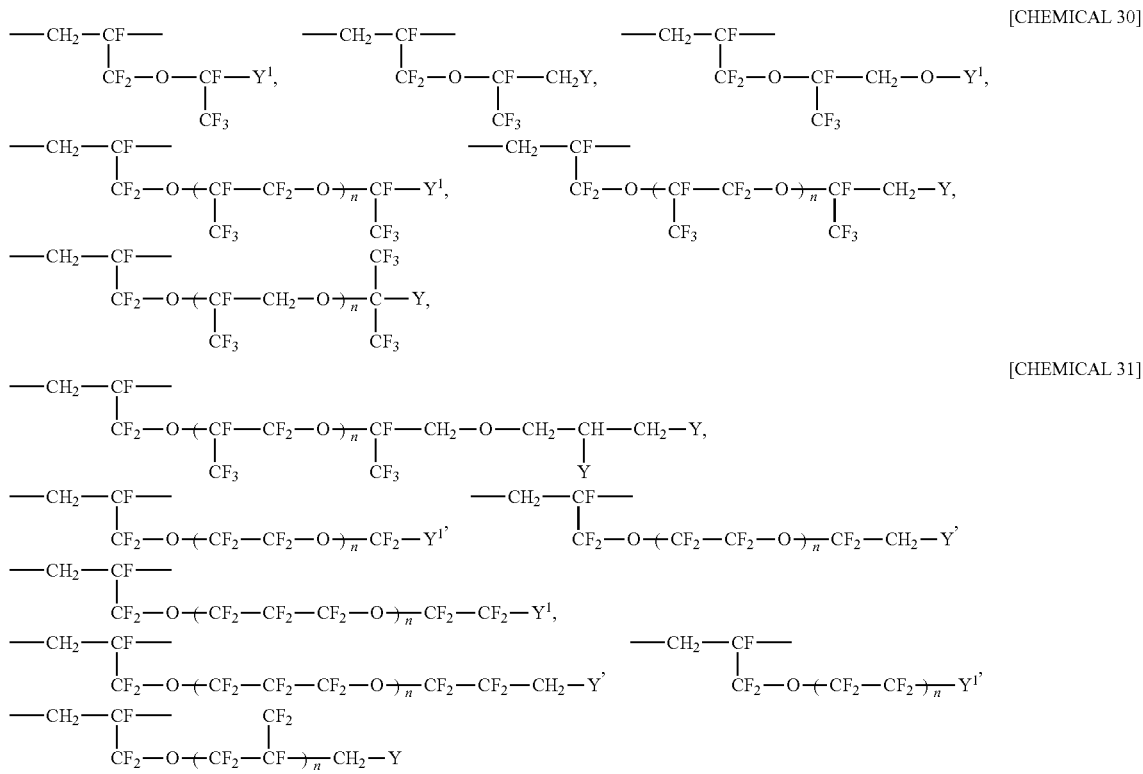
[CHEMICAL 30]
[CHEMICAL 31]
and further particularly,
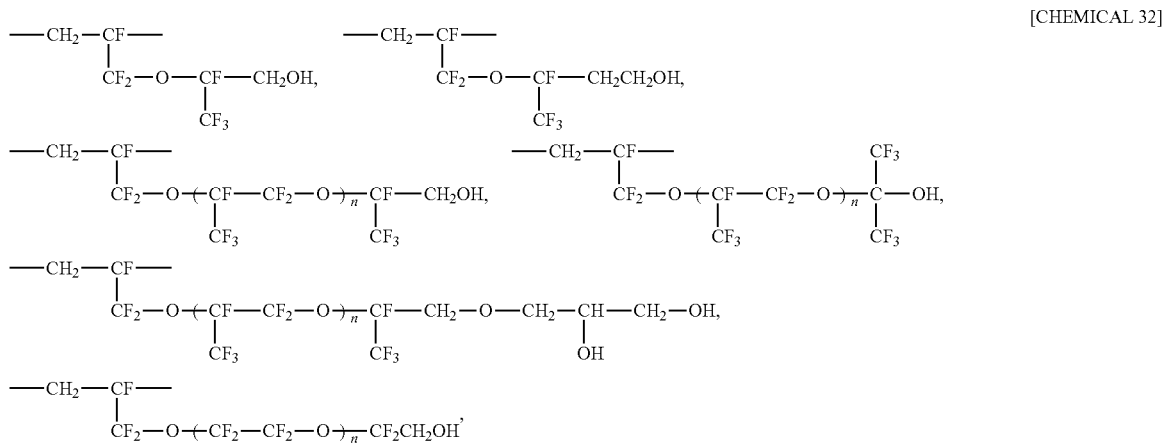
[CHEMICAL 32]

-continued
[CHEMICAL 33]

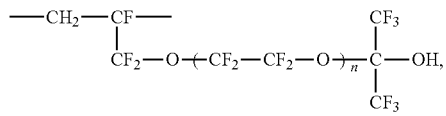
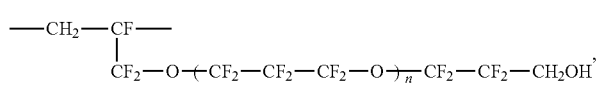
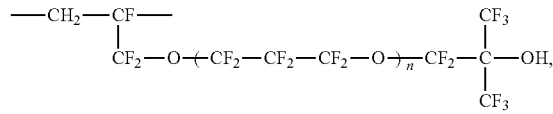
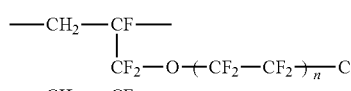
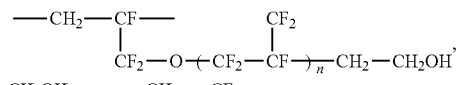
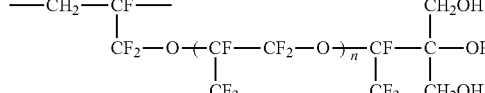
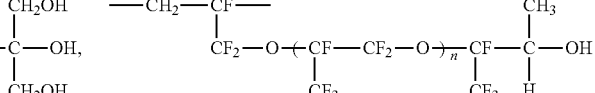

and the like may be mentioned.

Out of these, from the viewpoints of the solubility for an acrylic monomer, and the reactivity with an isocyanate group (—NCO),

[CHEMICAL 34]

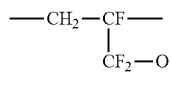 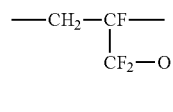

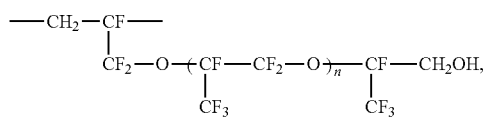

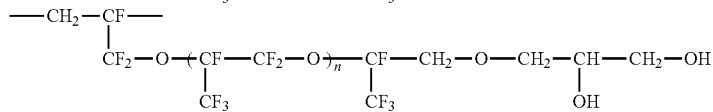

is in particular preferred.

The hydroxyl group-containing fluorinated polymer may further contain a monomer unit not containing a hydroxyl group in the structural unit in such a range as not to impair the solubility for an acrylic. For the specific examples of such a monomer unit, there can be adopted all those not having a hydroxyl group in the structural units A and M described in WO02/18457.

Out of these, from the viewpoint of the solubility for acrylic monomers, particularly,

—CH$_2$=CF$_2$—,

—CH$_2$—CF(CF$_3$)—, and

[CHEMICAL 35]

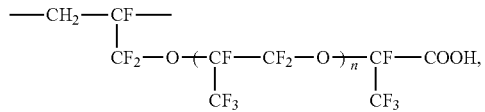

-continued

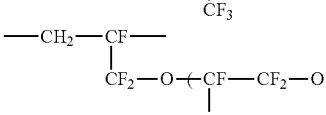

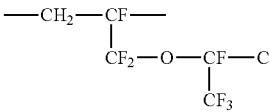

are preferable.

As specific hydroxyl group-containing fluorinated polymers, from the viewpoints of the solubility for acrylic monomers, and the reactivity with NCO,

[CHEMICAL 36]

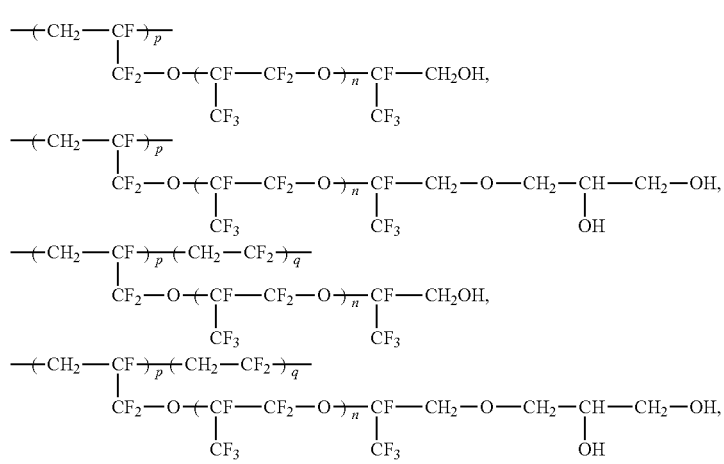

[CHEMICAL 37]

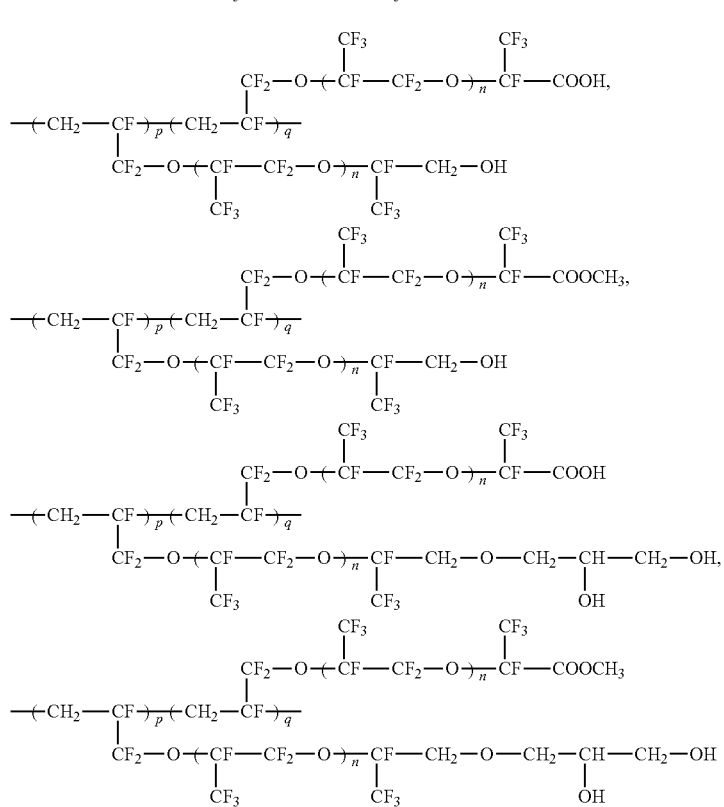

(where in the formula, the ratio of p and q is, by mole ratio, 20/80 to 99/1), and the like may be mentioned.

As the radical-polymerizable unsaturated groups in the isocyanate group-containing unsaturated compound (A-2), mention may be made of a methacryl group, an acryl group, a 2-fluoroacryl group, and a 2-chloroacryl group. From the viewpoints of the polymerization reactivity, the cost, and the ease of synthesis, a methacryl group and an acryl group are preferable, and especially, an acryl group is in particular preferable.

As the isocyanate group-containing unsaturated compounds (A-2), for example, alkyl vinyl ether and alkyl allyl ether represented by the formula (IV):

[CHEMICAL 38]

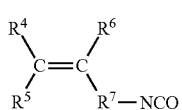

(IV)

(where in the formula, $R^4$, $R^5$, or $R^6$ may be the same or different, and is a hydrogen atom, a fluorine atom, a chlorine atom, or a alkyl group having 1 to 4 carbon atoms, and $R^7$ is —COO—$R^8$—, —OCO—$R^8$, or —O—$R^8$— (provided that $R^8$ is an alkyl group having 1 to 20 carbon atoms)) may be mentioned.

As the isocyanate group-containing unsaturated compounds (A-2), for example, 2-isocyanate ethyl acrylate represented by the formula (V):

$$CH_2=CHCOOCH_2CH_2NCO \quad (V)$$

2-isocyanate ethyl methacrylate represented by the formula (VI):

$$CH_2=C(CH_3)COOCH_2CH_2NCO \quad (VI)$$

the compound represented by the formula (VII):

[CHEMICAL 39]

(VII)

4-isocyanate butyl acrylate, and 4-isocyanate butyl methacrylate may be mentioned.

Further, out of the reaction products obtained by allowing unsaturated monoalcohols to react with polyhydric isocyanates, those having one isocyanate group may be mentioned. Examples of polyhydric isocyanates may include: 2,4-tolylene diisocyanate, 2,6-tolylene diisocyanate, mixed isocyante of 2,4-tolylene diisocyanate and 2,6-tolylene diisocyanate, P,P'-diphenylmethane diisocyanate, 1,5-naphthylene diisocyanate, paraphenylene diisocyanate, 1,6-hexamethylene diisocyanate, isophorone diisocyanate, and hydrogenated xylylene diisocyanate. Further, as unsaturated monoalcohols, mention may be made of monoalcohols having an acryloyl group or a methacryloyl group such as 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate, and monoalcohols having an allyl group such as allyl alcohol, allyl cellosolve, and trimethylpropane diallyl ether. Out of these, from the viewpoints of the ease of synthesis and the high reactivity, 2-isocyanate ethyl acrylate or 2-isocyanate ethyl methacrylate is preferable.

The reaction product (A) results from urethane bonding between the hydroxyl group in the hydroxyl group-containing fluorinated polymer (A-1), and the isocyanate group in the isocyanate group-containing unsaturated compound (A-2).

The fluorine content of the reaction product (A) is preferably 20 mass % or more from the viewpoints that the weather resistance, the water-repellent/oil-repellent property, and the antifouling property are excellent. From the viewpoint that the transparency is excellent within a wide wavelength range from visible to near infrared region, the fluorine content is more preferably 40 mass % or more, and further preferably 50 mass % or more. Further, the fluorine content of the reaction product (A) is preferably 75 mass % or less, more preferably 70 mass % or less, and further preferably 65 mass % or less from the viewpoint that the solubility for an acrylic is excellent.

The molecular weight of the reaction product (A) is, by number-average molecular weight, preferably 1000 or more, more preferably 2000 or more, and further preferably 3000 or more from the viewpoints that the strength and the surface hardness of the cured product resulting from curing of a curable composition prepared therefrom are excellent. Further, the molecular weight of the reaction product (A) is, by number-average molecular weight, preferably 500000 or less from the viewpoints that the viscosity does not increase, resulting in excellent handling, more preferably 100000 or less from the viewpoint that the solubility for an acrylic is excellent, and further preferably 50000 or less from the viewpoints that the viscosity of the composition is low, resulting in excellent handling.

The acrylic monomer (B) in the curable resin composition (IX) denotes a monomer having one, or two or more of acryloyl groups, methacryloyl groups, 2-fluoroacryloyl groups, or 2-chloroacryloyl groups, and denotes the one different from the isocyanate group-containing unsaturated compound (A-2) having a radical reactive group.

The radical-polymerizable unsaturated groups in the acrylic monomer (B) are preferably in a number of one from the viewpoint that the solubility of the hydroxyl group-containing fluorinated copolymer (A-1) is high, and that the viscosity is low; further, preferably in a number of two or more from the viewpoint that the strength of the cured product resulting from curing of a curable composition prepared therefrom is excellent; and further, more preferably in a number of three or more from the viewpoint that the curing speed of the curable composition is excellent.

As the acrylic monomer (B), specifically, mention may be made of: methyl methacrylate (MMA), methacrylic acid (MA), ethyl methacrylate (EMA), n-butyl methacrylate (nBMA), isobutyl methacrylate (iBMA), 2-ethylhexyl methacrylate, 2-hydroxyethyl methacrylate (HEMA), phenyl methacrylate, cyclohexyl methacrylate, 3-(trimethoxysilyl) propyl methacrylate (MSPM), 2-(phenylphosphoryl)ethyl methacrylate (phenyl-P), 2-hydroxy-3-(β-naphthoxy)propyl methacrylate (HNPM), N-phenyl-N-(2-hydroxy-3-methacryloxy)propyl glycine (NPG-GMA), ethylene glycol dimethacrylate (EDMA or 1G), diethylene glycol dimethacrylate (DiEDMA), triethylene glycol dimethacrylate (TriEDMA), 1,4-butanediol dimethacrylate (1,4-BuDMA), 1,3-butanediol'dimethacrylate (1,3-BuDMA), 1,6-hexanediol diacrylate (16HX), 2,2-bis[4-(2-hydroxy-3-methacryloxypropoxy)phenyl]propane (Bis-GMA), 2,2-bis (4-methacryloxyphenyl)propane (BPDMA), 2,2-bis(4-methacryloxyethoxyphenyl)propane (Bis-MEPP), 2,2-bis(4-methacryloxypolyethoxy phenyl) propane (Bis-MPEPP), di(methacryloxyethyl)trimethyl hexamethylene diurethane (UDMA), trimethylolpropane trimethacrylate (TMPA), pentaerythritol triacrylate, pentaerythritol tetraacrylate, dipentaerythritolhexaacrylate (DPEHA), and the like. Further, respective acrylates, respective 2-fluoroacrylates, and respective 2-chloroacrylates corresponding to these can be exemplified.

Further, examples of the fluorinated acrylic monomers may include:
$CH_2=C(CH_3)COOCH_2CF_3$ (3FMA),
$CH_2=C(CH_3)COOCH_2CF_2CF_2H$ (4FMA),
$CH_2=C(CH_3)COOCH_2CF_2CF_3$ (5FMA)
$CH_2=C(CH_3)COOCH_2CF_2CFHCF_3$ (6FMA)
$CH_2=C(CH_3)COOCH_2(CF_2)_3CF_2H$ (8FMA)
$CH_2=C(CH_3)COOCH_2CH_2(CF_2)_3CF_3$ (9FMA)
$CH_2=C(CH_3)COOCH_2(CF_2)_5CF_2H$ (12FMA),
$CH_2=C(CH_3)COOCH_2CH_2(CF_2)_5CF_3$ (13FMA)
$CH_2=C(CH_3)COOCH_2CH_2(CF_2)_7CF_3$ (17FMA),
$CH_2=C(CH_3)COOCH(CF_3)_2$ (HFIP-MA),
$CH_2=C(CH_3)COOCH_2CCH_3(CF_3)_2$ (6FNP-MA), and
$CH_2=C(CH_3)COOCH_2CF(CF_3)$ $OCF_2CF_2CF_3$ (6FOn1-MA),
and further, respective acrylates, respective 2-fluoroacrylates, and respective 2-chloroacrylates corresponding to these.

Examples the 2-fluoroacrylates may include:
$CH_2=CFCOOCH_2CF_2CF_2H$ (4FFA),
$CH_2=CFCOOCH_2CF_2CF_3$ (5FFA),
$CH_2=CFCOOCH_2(CF_2)_3CF_2H$ (8FFA), $CH_2=CFCOOCH_2(CF_2)_5CF_2H$ (12FFA), and
$CH_2=CFCOOCH(CF_3)_2$ (HFIP-FA).

The foregoing acrylic monomers may be mentioned. From the viewpoint that the solubilities for the hydroxyl group-containing fluorinated polymer (A-1), the isocyanate group-containing unsaturated compound (A-2), and the reaction product thereof (A) are excellent, preferred are methyl methacrylate, ethyl methacrylate, methyl acrylate, and ethyl acrylate.

The mass ratio of the reaction product (A) and the acrylic monomer (B) is preferably 95:5 to 5:95, more preferably 80:20 to 20:80, and further preferably 70:30 to 30:70. When the mass ratio of the reaction product (A) and the acrylic monomer (B) deviates from 95:5, and the reaction product (A) increases in mass, the reaction product (A) tends to increase in viscosity, and to become difficult to handle. Whereas, when the mass ratio of the reaction product (A) and the acrylic monomer (B) deviates from 5:95, and the reaction product (A) decreases in mass, the fluorine content is reduced. Accordingly, the cured product resulting from curing of the curable composition tends to be reduced in weather resistance, water-repellent/oil-repellent property, and anti-fouling property.

diisocyanate, diphenylmethane-4,4'-diisocyanate, xylylene diisocyanate, isophorone diisocyanate, lysine methyl ester diisocyanate, methylcyclohexyl diisocyanate, trimethyl hexamethylene diisocyanate, hexamethylene diisocyanate, and n-pentane-1,4-diisocyanate or trimers thereof, adduct forms thereof, biuret form thereof, polymers thereof having two or more isocyanate groups, and further blocked isocyanates.

Specific examples of the amino resins may include, but are not limited to: other than urea resin, melamine resin, benzoguanamine resin, and glycoluril resin, methylolated melamine resin obtained by methylolating melamine, and alkyl etherified melamine resin obtained by etherifying methylolated melamine with alcohols such as methanol, ethanol, and butanol.

Specific examples of the acid anhydrides may include, but are not limited to: phthalic anhydride, pyromellitic anhydride, and mellitic anhydride.

As the polyepoxy compounds and the isocyanate group-containing silane compounds, there can be used, for example, those described in JP-A H2-232250, JP-A H2-232251, and the like. As preferable examples, for example

[CHEMICAL 40]

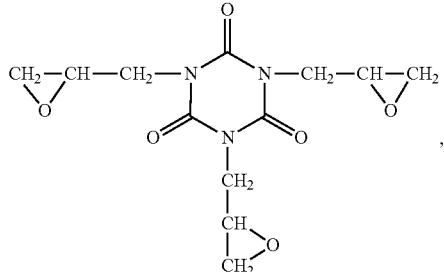

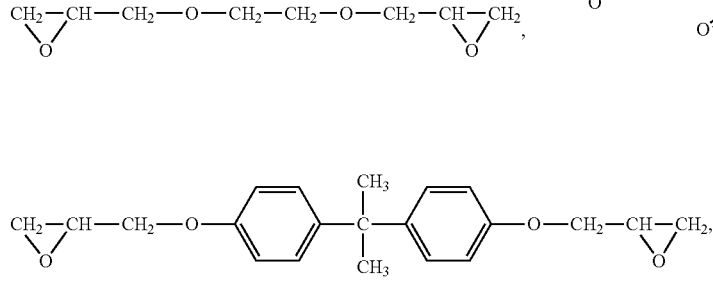

The viscosity at 30° C. of the curable resin composition is preferably 5 mPa·s or more because too low viscosity results in much dripping, which rather reduces the handling property. From the viewpoint that the thin film formability is excellent, the viscosity is more preferably 10 mPa·s or more. From the viewpoint that curing shrinkage during curing is small, the viscosity is further preferably 50 mPa·s or more. Further, the viscosity at 30° C. of the curable resin composition is, from the viewpoint that the handling property is excellent, preferably 100000 mPa·s or less. From the viewpoint that during molding processing, the curable composition spreads therethroughout, the viscosity is more preferably 50000 mPa·s or less. From the viewpoint that when a thin film is formed, levelling (surface smoothness) property is excellent, the viscosity is further preferably 20000 mPa·s or less.

The curable resin composition (IX) may further contain a curing agent. The curing agent is a compound which reacts with the curing reactive group of the hydroxyl group-containing fluorinated polymer (A-1) for crosslinking. For example, there are commonly used isocyanates not having an unsaturated bond, amino resins, acid anhydrides, polyepoxy compounds, and isocyanate group-containing silane compounds.

Specific examples of the isocyanates not having an unsaturated bond may include, but is not limited to: 2,4-tolylene $OCNC_3H_6Si(OC_2H_5)_3$,
$OCNC_2H_4Si(OCH_3)_3$, and the like may be mentioned.

The mixing amount of the curing agent is 0.1 to 5 equivalents, and preferably 0.5 to 1.5 equivalents per equivalent of the chemically curing reactive group in the hydroxyl group-containing fluorinated polymer (A-1). The composition of the present invention can generally be cured for several minutes to about 10 days at 0 to 200° C.

Further, for curing the curable resin composition, curing is caused by UV irradiation for polymerizing the reaction product (A) and the acrylic monomer (B). For this reason, the curable resin composition may contain therein a photopolymerization initiator. Specific examples of the photopolymerization initiator may include: acetophenone type compounds such as acetophenone, chloroacetophenone, diethoxyacetophenone, hydroxyacetophenone, and α-aminoacetophenone; benzoin type compounds such as benzoin, benzoin methyl ether, benzoin ethyl ether, benzoin isopropyl ether, benzoin isobutyl ether, and benzyldimethyl ketal; benzophenone type compounds such as benzophenone, benzoylbenzoic acid, benzoyl methyl benzoate, 4-phenyl benzophenone, hydroxy benzophenone, hydroxy-propyl benzophenone, acrylated benzophenone, Michler's ketone, and 2-hydroxy-2-methylpropiophenone; thioxanthones such as thioxanthone, chlorothioxanthone, methyl thioxanthone, diethyl thioxanthone, and dimethyl thioxanthone; and as other compounds, benzyl, α-acyloxime ester, acyl phosphine oxide, glyoxy ester, 3-ketocumarine, 2-ethyl anthraquinone, camphorquinone, and anthraquinone.

Further, if required, known photoinitiator aids such as amines, sulfones, and sulfines may be added.

The curable resin composition (IX) does not contain an organic solvent not having a radical reactive group and a fluorine type solvent. This is preferable in that the step of removing the solvent after curing the curable resin composition is unnecessary, and in that there are no adverse effects such as reduction of the heat resistance, reduction of the strength, and cloudiness due to the residual solvents. Further, for the curable resin compositions (IX), as with the curable resin compositions (VIII), the curing catalysts exemplified previously can be used.

Further, according to the intended use, to the weather resistant organic material, an organic solvent can also be added.

Examples of the organic solvent may include: hydrocarbon type solvents such as xylene, toluene, Solvesso 100, Solvesso 150, and hexane; ester type solvents such as methyl acetate, ethyl acetate, butyl acetate, acetic acid ethylene glycol monomethyl ether, acetic acid ethylene glycol monoethyl ether, acetic acid ethylene glycol monobutyl ether, acetic acid diethylene glycol monomethyl ether, acetic acid diethylene glycol monoethyl ether, acetic acid diethylene glycol monobutyl ether, acetic acid ethylene glycol, and acetic acid diethylene glycol; ether type solvents such as dimethyl ether, diethyl ether, dibutyl ether, ethylene glycol monomethyl ether, ethylene glycol monoethyl ether, ethylene glycol monobutyl ether, ethylene glycol dimethyl ether, ethylene glycol diethyl ether, ethylene glycol dibutyl ether, diethylene glycol monomethyl ether, diethylene glycol monoethyl ether, diethylene glycol monobutyl ether, diethylene glycol dimethyl ether, diethylene glycol diethyl ether, diethylene glycol dibutyl ether, and tetrahydrofuran; ketone type solvents such as methyl ethyl ketone, methyl isobutyl ketone, and acetone; amide type solvents such as N,N-dimethylacetamide, N-methyl acetamide, acetamide, N,N-dimethylformamide, N,N-diethyl formamide, and N-methyl formamide; sulfonic acid ester type solvents such as dimethyl sulfoxide; and alcohol type solvents such as methanol, ethanol, isopropanol, butanol, ethylene glycol, diethylene glycol, polyethylene glycol (degree of polymerization 3 to 100), $CF_3CH_2OH$, $F(CF_2)_2CH_2OH$, $(CF_3)_2CHOH$, $F(CF_2)_3CH_2OH$, $F(CF_2)_4C_2H_5OH$, $H(CF_2)_2CH_2OH$, $H(CF_2)_3CH_2OH$, and $H(CF_2)_4CH_2OH$. From the viewpoints of the compatibility, the coating film outward appearance, and the storage stability, preferred are alcohol type solvents such as lower alcohols, and lower fluorinated alcohols.

As the mixing ratio of the weather resistant organic material and an alcohol type solvent, alcohol is in a ratio of 1 to 50 parts by weight per 100 parts by weight of the weather resistant organic material. From the viewpoints of the curability and the coating film outward appearance, the ratio is further preferably 1 to 25 parts by weight.

Further, when the curing agent has a high reactivity with alcohols as ordinary temperature-curable type isocyanates, the ratio is further preferably 1 to 15 parts by weight, and the alcohols are also preferably secondary or tertiary alcohols.

To the hydrophilization paint, further, an UV absorber, a silane coupling agent, and/or a hydrophilization promoter, and the like can be added.

When an UV absorber is added thereto, to the coating film, actions of improving the underlayer protecting property and the weather resistance are imparted. As specific examples thereof, for example, benzophenone type and benzotriazole type UV absorbers, and cyano acrylate type UV absorbers are preferable. Out of these, effective are, in the benzophenone type, 2,2'-dihydroxy-4,4'-dimethoxy benzophenone, 2,2'-dihydroxy-4-methoxybenzophenone and 2,2',4,4'-tetrahydroxy benzophenone; and, in benzotriazole type, 2-(2'-hydroxy-5'-methylphenyl)benzotriazole, 2-(2'-hydroxy-5'-methylphenyl)-5,6-dichlorobenzotriazole), 2-(2'-hydroxy-5'-tert-butylphenyl)benzotriazole, 2-(2'-hydroxy-3',5'-di-tert-butylphenyl)-5-chloro-benzotriazole, 2-(2'-hydroxy-5'-phenyl phenyl)-5-chlorobenzotriazole, 2-(2'-hydroxy-3'-tertbutylphenyl)-5-chlorobenzotriazole, 2-(2'-hydroxy-3',5'-ditertbutylphenyl)benzotriazole, and 2-(2'-hydroxy-5'-tertoctyl phenyl)benzotriazole.

As cyano acrylate type UV absorbers, for example, 2-ethylhexyl 2-cyano-3,3-diphenyl acrylate, and ethyl 2-cyano-3,3-diphenyl acrylate can be effectively used.

Particularly preferable UV absorbers are those of the type represented by the following formula:

[CHEMICAL 41]

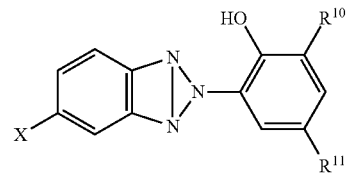

(where in the formula, $R^{10}$ and $R^{11}$ are the same or different, and each represents a hydrogen atom, a lower alkyl group, especially, a branched chain lower alkyl group, or an aryl group, particularly, a phenyl group, X is a hydrogen atom or a halogen atom, particularly, a chlorine atom). Further, cyano acrylate type UV absorbers are less likely to be affected by hydrolysis, and hence are in particular preferable.

The silane coupling agent imparts the recoating adhesion to the coating film. Specific examples thereof may include: as the silane coupling agents, methyl trimethoxysilane, ethyl triethoxysilane, dimethyl dimethoxysilane, trimethyl methoxysilane, vinyl trimethoxysilane, 3-(glycidyloxy)propyl trimethoxysilane, N-(2-aminoethyl)-3-aminopropyl trimethoxysilane, 3-aminopropyl trimethoxysilane, 3-aminopropyl triethoxysilane, 3-mercaptopropyl trimethoxysilane, 3-trimethoxysilylpropyl isocyanate, 3-triethoxysilylpropyl isocyanate, and methyl tris(ethyl methyl ketoxime)silane. Those containing an alkyl ketoxime group, or an isocyanate group are preferable. Particularly, from the viewpoint that the recoatability is excellent, a silane coupling agent having an isocyanate group or an epoxy group is preferable.

By adding a hydrophilization promoter, in the present invention, the hydrolysis of an organometallic compound having a high hydrophilization capacity is aided, and the hydrophilization of the coating film surface is promoted. Further, when the paint resin in the organic material is of a curable type, it contributes to promotion of curing of the coating film. Specific examples thereof may include those exemplified for the curing catalyst. From the viewpoint of hydrophilization, organotin compounds and aluminum chelate compounds are preferable.

Other than these, to the weather resistant organic material, there can also be added additives such as thickener, levelling agent, anti-foaming agent, film-forming aid, HALS, matting agent, filler, colloidal silica, fungicide, anti-skinning agent, antioxidant, flame retarder, dripping inhibitor, antistatic agent, rust inhibitor, and water-soluble resin (such as polyvinyl alcohol or polyethylene oxide).

As a method for forming a film made of an organic material, a proper known method suited to the intended use can be adopted. For example, when the film thickness is required to be controlled, there can be adopted a roll coating method, a gravure coating method, a microgravure coating method, a flow coating method, a bar coating method, a spray coating method, a die coating method, a spin coating method, a dip coating method, or the like.

For the curing method, the optimum one for the material is selected. Generally, there is used either of a heat imprint method or a light imprint method. With the heat imprint method, a thermoplastic material is used, and is brought into close contact with a mold at high temperatures. Then, the temperature is reduced to perform mold release. In light imprint, a photo-curable resin or sol/gel material, or the like is used, and the material is poured into the mold. Then, mainly, an ultraviolet ray is applied thereto, thereby to cure the material. Then, mold release is performed. For mold release, as a mold release agent, conventionally known mold release agents such as OPTOOL DSX (trade name, manufactured by Daikin Industries, Ltd.) and DURASURF HD-1100 and 2100 series (trade name, manufactured by HARVES Co., Ltd.) may be applied and used.

The light-concentrating film preferably concentrates an average of 80% or more of light incident at an angle of 0 to 89° with respect to the direction of the normal to the light-concentrating film. With a planar film using a conventional computer generated hologram, only a light-concentrating film with a pattern having a binary gradation can be manufactured. For this reason, the light incident at a shallow angle with respect to the in-plane direction of the light-concentrating film cannot be concentrated sufficiently. The light-concentrating film of the present invention has a multilevel gradation pattern. Accordingly, even for light incident at an angle of 0 to 89°, the light concentration rate can be set at an average of 80% or more. The light incident at an angle of 0 to 89° with respect to the direction of the normal to the light-concentrating film preferably includes light incident upon a region having multilevel gradation pattern. The light concentration rate can be measured with a method using a light-receptive element, but may be calculated by simulation using optical design software ZEMAX (manufactured by T. E. M. Incorporated).

The thickness of the light-concentrating film may be appropriately set according to the intended application for use, and for example, the thickness is preferably 0.03 to 20 mm. More preferably, it is 0.1 to 5 mm. When the light-concentrating film has a thickness within the range, it can be preferably used as a light-concentrating film for solar cell. The film thickness is determined by measuring the maximum thickness of the light-concentrating film using a thickness meter.

For the light-concentrating film, the yellow index $\Delta YI$ value is preferably 20 or less. More preferably, it is 10 or less, and further preferably 5 or less.

The yellow index $\Delta YI$ value is a value obtained by measuring the light-concentrating film subjected to a pressure cooker test under a 105° C. and 100% RH atmosphere for 200 hours by means of a color difference meter.

A method for producing a light-concentrating film preferably includes a step of calculating the multilevel gradation pattern by discrete Fourier transform; and a step of forming a light-concentrating film having the multilevel gradation pattern. As described above, by discrete Fourier transform, the operation speed can be improved. For this reason, the produced light-concentrating film has a high quality, and can form a large-area multilevel gradation pattern. The step of calculating the multilevel gradation pattern can be performed by using the Fourier transform device.

As one of preferred aspects, the method for producing a light-concentrating film includes a step of forming a mold having the reversal pattern of the multilevel gradation pattern calculated by discrete Fourier transform, and a step of bringing the mold into contact with a film made of an organic material, and forming a light-concentrating film having a multilevel gradation pattern, or a step of forming a light-concentrating film having a multilevel gradation pattern by injection molding using the mold as a die.

The mold can be manufactured using a photolithography method for performing exposure by irradiation while changing the intensity from place to place using a light source such as an electron beam (EB), an argon laser (363 nm light source wavelength), a blue semiconductor laser (405 nm light source wavelength), a krypton laser (413 nm light source wavelength), or a helium-cadmium laser (442 nm light source wavelength). When a mold is manufactured, development of a resist after exposure results in the formation of a resist with unevenness having a multilevel gradation according to the exposure light source intensity of electron beam or the like. This is subjected to asking with a plasma, or a metal film is evaporated thereon, thereby performing electroforming. Then, the substrate and the resist are released, resulting in a metal mold. The materials for the mold have no particular restriction. However, for example, preferred are metal materials such as nickel and silicon, quartz, and glass.

Incidentally, the "reversal pattern of the multilevel gradation pattern" is a pattern having an uneven shape reverse to that of the multilevel gradation pattern, and is the one capable of forming a multilevel gradation pattern when the reversal pattern is brought into contact with the objective organic material. FIG. 2 is a cross-sectional schematic view showing one example of the mold. For example, a mold 2 is the one having a reversal pattern corresponding to the multilevel gradation pattern of the light-concentrating film shown in FIG. 1. For example, by bringing the mold 2 having a reversal pattern 21 into contact with an organic material film, it is possible to form a light-concentrating film having a multilevel gradation pattern.

As the methods for bringing the mold into contact with an organic material, mention may be made of a method in which the reversal pattern-formed side of the mold is brought into contact with a film made of an organic material, thereby transfer the multilevel gradation pattern; a method of performing injection molding with the mold as a die; and other methods.

It is also one of preferable modes that the method for producing a light-concentrating film includes a step of applying a laser to a film made of an organic material, and forming a light-concentrating film having a multilevel gradation pattern. In this case, on the film made of an organic material, the multilevel gradation pattern resulting from calculation by the discrete Fourier transform is directly drawn with a laser, thereby to form a light-concentrating film having a multilevel gradation pattern. This is distinguished from the hologram formed by the laser imprint. As the laser used for the case where the film made of an organic material is irradiated with a laser, a laser used in the photolithography method can be used.

The light-concentrating film of the present invention can be used in various optical fields. For example, the light concentrated through the light-concentrating film can be used for solar cell, illumination in buildings, commercial facilities, and ordinary households, and the like. The illumination is also effective as a substitute for, for example, illumination (such as LED) at plant factories, or TV backlight.

Further, the light-concentrating film of the present invention can also diffuse the incident light, and is also effective as a substitute for a diffusion plate for diffusing light emitted from a LED light source for use in, for example, a LED television set.

The present invention is also a focusing element including the light-concentrating film. The focusing element of the present invention can remarkably improve the in-plane focusing efficiency in order to enable light concentration in a wide angular range by the light-concentrating film. It is essential only that he focusing element of the present invention includes at least the light-concentrating film. The shape thereof may be a flat shape, a domical (semi-spherical shape), or the like. The focusing element preferably includes a light-concentrating film and a lens. As the lenses, mention may be made of, but is not particularly limited to, a prism lens, a fly-eye lens, a lens array, a linear Fresnel lens, a Fresnel lens described later, a lenticular lens, and the like.

The lens is preferably made of a fluororesin. The lens being a fluororesin improves the durability as the focusing element, and hence the lens becomes a focusing element which can be preferably used for a solar cell or the like. As fluororesins used for the lens, mention may be preferably made of the fluororesins exemplified for the light-concentrating film. Preferable fluororesin is at least one fluororesin selected from the group consisting of ETFE, PCTFE, EFEP, FEP, and PVdF.

The focusing element preferably includes at least one selected from the group consisting of Fresnel lenses and lenticular lenses. The Fresnel lenses and the lenticular lenses may be those generally referred to as Fresnel lenses or lenticular lens, and have no particular restriction. As a result, the light in-plane focused in all directions through the light-concentrating film can be further focused to one point through a Fresnel lens or a lenticular lens. Although the light-concentrating film can perform omnidirectional light concentration when used singly, if the light-concentrating film and a Fresnel lens or a lenticular lens are used in combination, the focusing distance can be controlled and the light density can be enhanced, whereby the dramatic improvement of the generating efficiency is facilitated.

Incidentally, by control of the results of the computer generated hologram, the light-concentrating film of the present invention focuses sunlight within a plane, and in addition, is more uniform and aplanatic as compared with a conventional Fresnel lens and lenticular lens, and can also express a high precision one-point focusing function.

The present invention is also a solar cell including the focusing element. Provision of the focusing element having the light-concentrating film enables light concentration at a wide angular range. Even a non-tracking type solar cell can produce electric power with high efficiency. The solar cell is preferably a tracking type or non-tracking type solar cell, and more preferably a non-tracking type solar cell.

The solar cell of the present invention preferably includes the focusing element and a solar battery cell. Any solar battery cell is acceptable so long as it can produce electric power by receiving light. Examples thereof may include those obtained by pn-joining n type semiconductors and p type semiconductors. Usable n type semiconductors and p type semiconductors have no particular restriction. The materials commonly used for a solar cell can be used. Examples thereof may include IV group semiconductors such as Si and Ge, III-V group compound semiconductors such as GaAs, InP, and AlGaAs, II-VI group compound semiconductors such as CdS, CdTe, and $Cu_2S$, group compound semiconductors such as $CuInSe_2$, $CuInS_2$, and $Cu(In, Ga)Se_2$, organic semiconductors such as phthalocyanine and polyacetylene, and three-junction laminations such as InGaP/(In) GaAs/Ge. Further, solar battery cells can be used irrespective of the crystal type or the amorphous type. Further, even when the cell is a quantum effect type or a dye sensitizing type solar cell, light concentration in a wide angular range becomes possible. Whether the cell is a solar cell of a tracking type or non-tracking type solar cell, it can produce electric power at a high efficiency. In general, the solar cell includes a wire coupled to the solar battery cell.

The structure of the solar cell has no particular restriction. Between the focusing element and the solar battery cell, another member having a translucency may be interposed. Alternatively, it may be configured such that, over the solar battery cell, the light-concentrating film (focusing element) is directly bonded. Further, as shown in FIG. 3, mention may be made of a mode including a focusing element 35 having a structure in which a Fresnel lens 32 and a light-concentrating film 31 are bonded by an adhesion layer 32, and a solar battery cell 34. In the mode of FIG. 3, the light in-plane focused by the light-concentrating film 31 is further focused to one point by the Fresnel lens 32. The solar battery cell 34 receives the focused light. Thus, spacing between the focusing element and the solar battery cell enables focusing, which can reduce the size of the solar battery cell. This can reduce the cost.

The present invention is a focusing method using the light-concentrating film, and is also a focusing method including a step of making light incident upon a side of a light-concentrating film having a multilevel gradation pattern, and a step of emitting the incident light from a side of the light-concentrating film, opposite to the light incident side. Light is made incident upon the side of the light-concentrating film having a multilevel gradation pattern. As a result, even when the light is light incident at a shallow angle with respect to the in-plane direction of the light-concentrating film, focusing is made possible, and focusing can be performed with high efficiency. For this reason, when the film is used for a solar cell, without being formed into a tracking type solar cell which changes the orientation of the solar cell according to respective orientations of the sun in morning, day, and night, the solar cell can implement high-efficiency generating efficiency in a non-tracking manner (omnidirectional light concentration). This enables reduction of the cost, simplification of facilities, and the like as compared with conventional solar cells. FIG. 6 is a schematic view showing a focusing method using the light-concentrating film. As shown in FIG. 6, with the focusing method of the present invention, the light incident upon a side 62 of the light-concentrating film 61 having a multilevel gradation pattern can be emitted from a side 63 opposite to the side having a multilevel gradation pattern.

The focusing method preferably includes a step of making the angle of a light emitted from the light-concentrating film with respect to the direction of the normal to the light-concentrating film smaller than the angle of light incident upon the light-concentrating film with respect to the direction of the normal to the light-concentrating film. The incident light is preferably at an angle with respect to the direction of the normal of the light-concentrating film of 89° or less.

Further, the focusing method preferably concentrates an average of 80% or more of light incident at an angle of 0 to 89° with respect to the direction of the normal to the light-concentrating film. The light incident at an angle of 0 to 89° with respect to the direction of the normal of the light-concentrating film is also preferably light incident upon a region having a multilevel gradation pattern.

Examples of articles of the light-concentrating film of the present invention may include, other than solar cell, those for the purpose of focusing for illumination in buildings, commercial facilities, ordinary households, and the like, microfluidic devices, optical devices, recording media, and LED diffusion plates. Examples of the microfluidic devices may include a microreactor chip and a micro TAS.

Examples of the optical devices may include microlenses and optical elements. As the articles of the present invention, mention may be further made of biochips, antireflection filters, catalyst carriers, and the like.

Effects of the Invention

The light-concentrating film of the present invention has the foregoing configuration, which enables light concentration in a wide angular range (e.g., omnidirectional light concentration). Further, use of a fluororesin can provide a light-concentrating film having a long-term stability. Use as an optical member of a solar cell results in an improvement of the focusing efficiency. This can improve the generating efficiency and reduce the cost.

BRIEF DESCRIPTION OF THE DRAWINGS

FIGS. 8(a) and 8(b) are each a scanning electron micrograph showing a reversal pattern of a multilevel gradation pattern formed in a metal rectangular mold, in which FIG. 8(a) is a projection micrograph, and FIG. 8(b) is a surface micrograph; and FIGS. 9(a) to 9(d) are plan schematic views and cross-sectional schematic views each showing the shape of a recessed portion in the light-concentrating film of the present invention, in which FIG. 9(a) is a plan schematic view of the light-concentrating film with a recessed portion in a tetragonal shape in plan view, FIG. 9(b) is a plan schematic view of the light-concentrating film with a recessed portion in a circular shape in plan view, FIG. 9(c) is a plan schematic view of the light-concentrating film with a recessed portion in a triangular shape in cross-sectional view, FIG. 9(d) is a plan schematic view of the light-concentrating film with a recessed portion in a semicircular shape in plan view, and FIG. 9(e) is a plan schematic view of the light-concentrating film with a recessed portion in a continuous elliptical shape in plan view.

BEST MODE FOR CARRYING OUT THE INVENTION

Then, the present invention will be described by way of examples and comparative examples. However, the present invention is not limited to only such examples.

(1) Calculation of Gradation Pattern

Example 1

Using a Fourier transform device, under the conditions such that the light transmittance of an organic material forming a light-concentrating film is 95%, and the refractive index thereof is 1.40, such that the film thickness (maximum film thickness) of the light-concentrating film is 100 um, and such that the light-concentrating film is in the shape of a circle with a diameter of 160 mm, the multilevel gradation pattern was calculated using discrete Fourier transform.

(2) Method for Producing Light-Concentrating Film

As an organic material film for forming a multilevel gradation pattern, an ETFE film (trade name: Neoflon ETFE, manufactured by Daikin Industries, Ltd.) was used.

Figure 8:
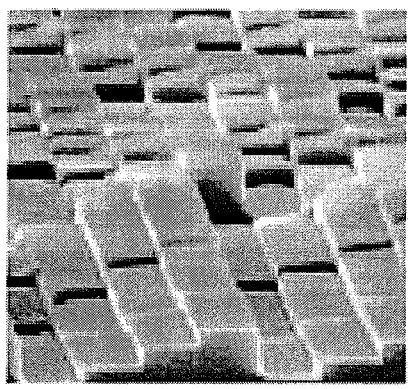
Figure 8:
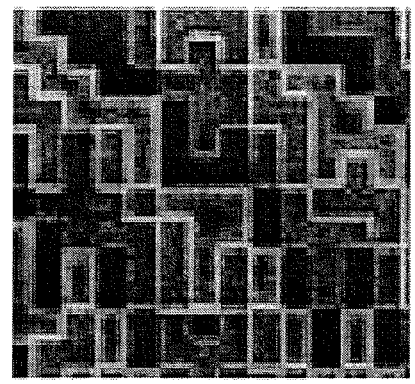
Figure 9:
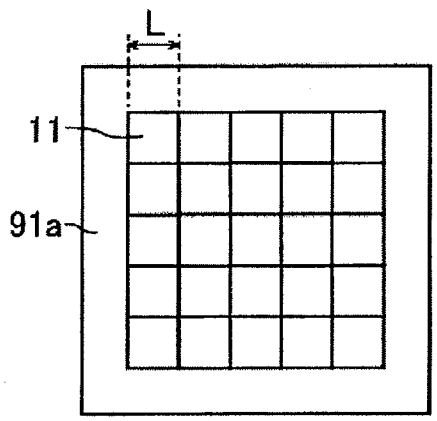
Figure 9:
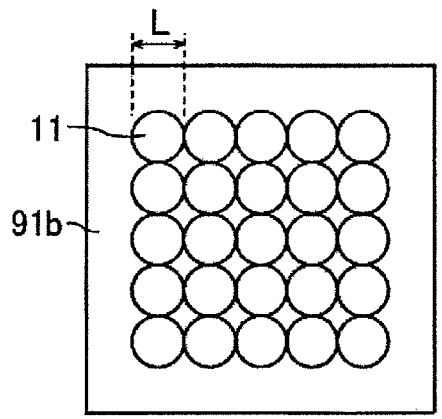
Figure 9:
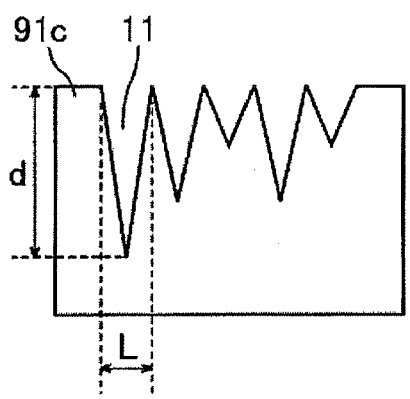
Figure 9:
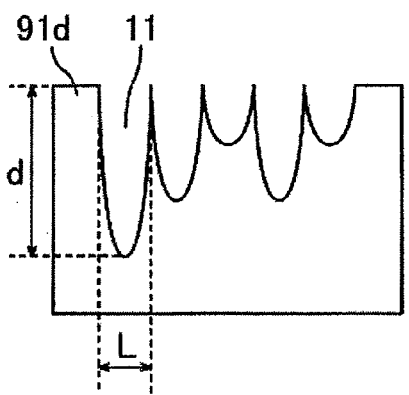
Figure 9:
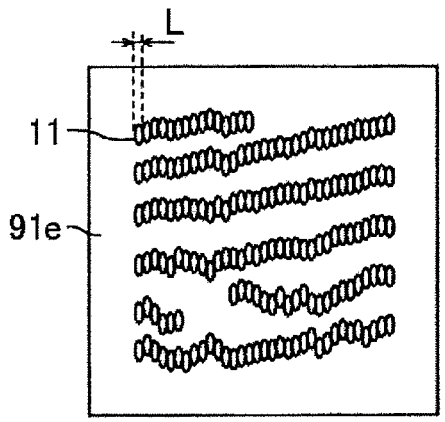

Production of a light-concentrating film will be described. A mold having a reversal pattern of the multilevel gradation pattern calculated by discrete Fourier transform was manufactured using a photolithography method. First, a resist applied on a silicon substrate was exposed and irradiated with an electron beam (EB) while changing the intensity from one site to another. Then, the resist was developed, thereby to form a resist film with unevenness having a multilevel gradation according to the light source intensity of the applied electron beam or the like. On the resist film, nickel was metal-evaporated. Then, the substrate and the resist film were released. This resulted in a metal rectangular mold (mold size 15 cm×15 cm) including four levels of gradation, a line width (pitch) of 500 nm, and a height of one level of gradation of 250 nm. The SEM photograph of the metal mold having the reversal pattern of the multilevel gradation pattern is shown in FIGS. 8(a) and 8(b).

Then, for the metal mold, to a film of a tetrafluoroethylene-ethylene alternate copolymer which is an organic material (Neoflon film ETFE manufactured by Daikin Industries, Ltd., thermal deformation temperature 104° C., film thickness 100 μm), using a nanoimprinting device NANOIMPRINTER NM-0401 (manufactured by MEISYO KIKO Co., Ltd.), the metal rectangular mold including four levels of gradation is pressed at room temperature under a pressure of 30 MPa for 5 minutes, thereby to form a light-concentrating film having a multilevel gradation pattern. For the resulting light-concentrating film, in a region having the multilevel gradation pattern, the maximum thickness of the processed rectangle (the maximum thickness of the region having the multilevel gradation pattern) was 1000 nm. The minimum thickness thereof (the minimum thickness of the region having the multilevel gradation pattern) was 250 nm.

Incidentally, after forming the multilevel gradation pattern as described above, the film was released with tweezers. Thus, the shape of the pattern formed on the film surface was observed by a scanning electron microscope [SEM] and an atomic force microscope [AFM] As a result, it has been confirmed that onto the resulting light-concentrating film, the shape of the mold is transferred with precision. Incidentally, the film thickness of the film which had undergone transfer was measured from the cross-sectional view of SEM (manufactured by Hitachi High-Technologies Corporation).

(Continuous Production Method of Light-Concentrating Film)

Figure 5:
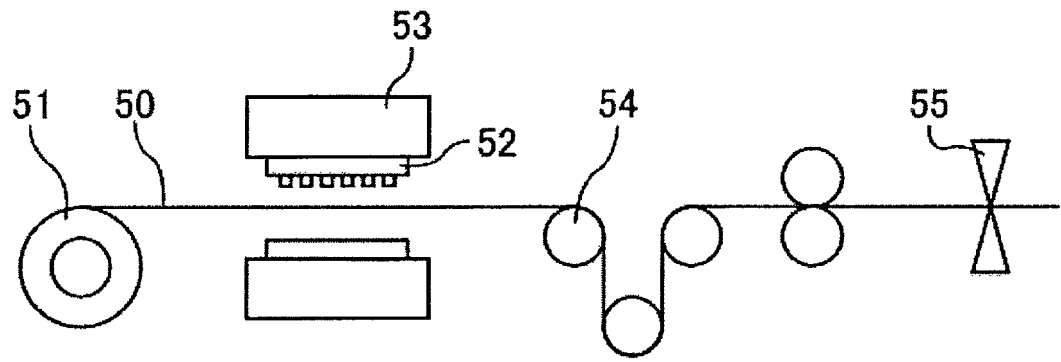
FIG. 5 is a schematic view showing one example of a step for bringing the mold into contact with an organic material, and forming a light-concentrating film.
Figure 6:
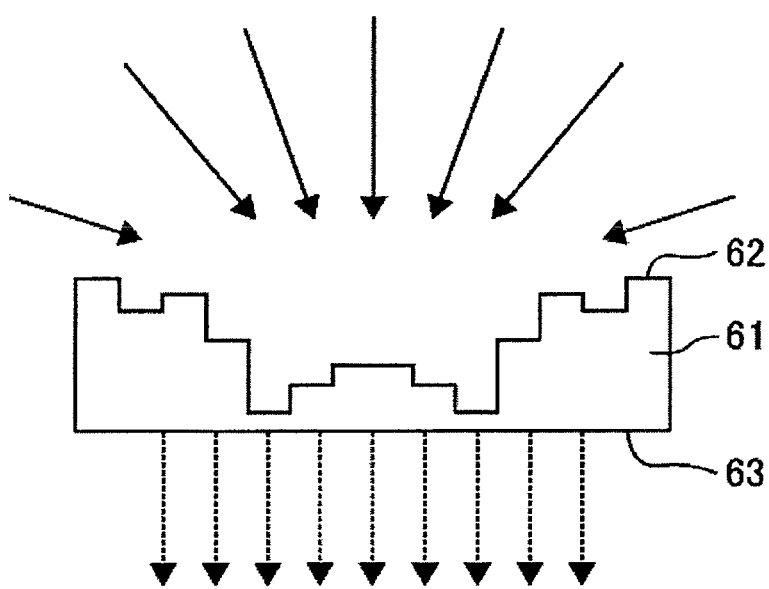
FIG. 6 is a schematic view showing a focusing method using a light-concentrating film.
Figure 7:
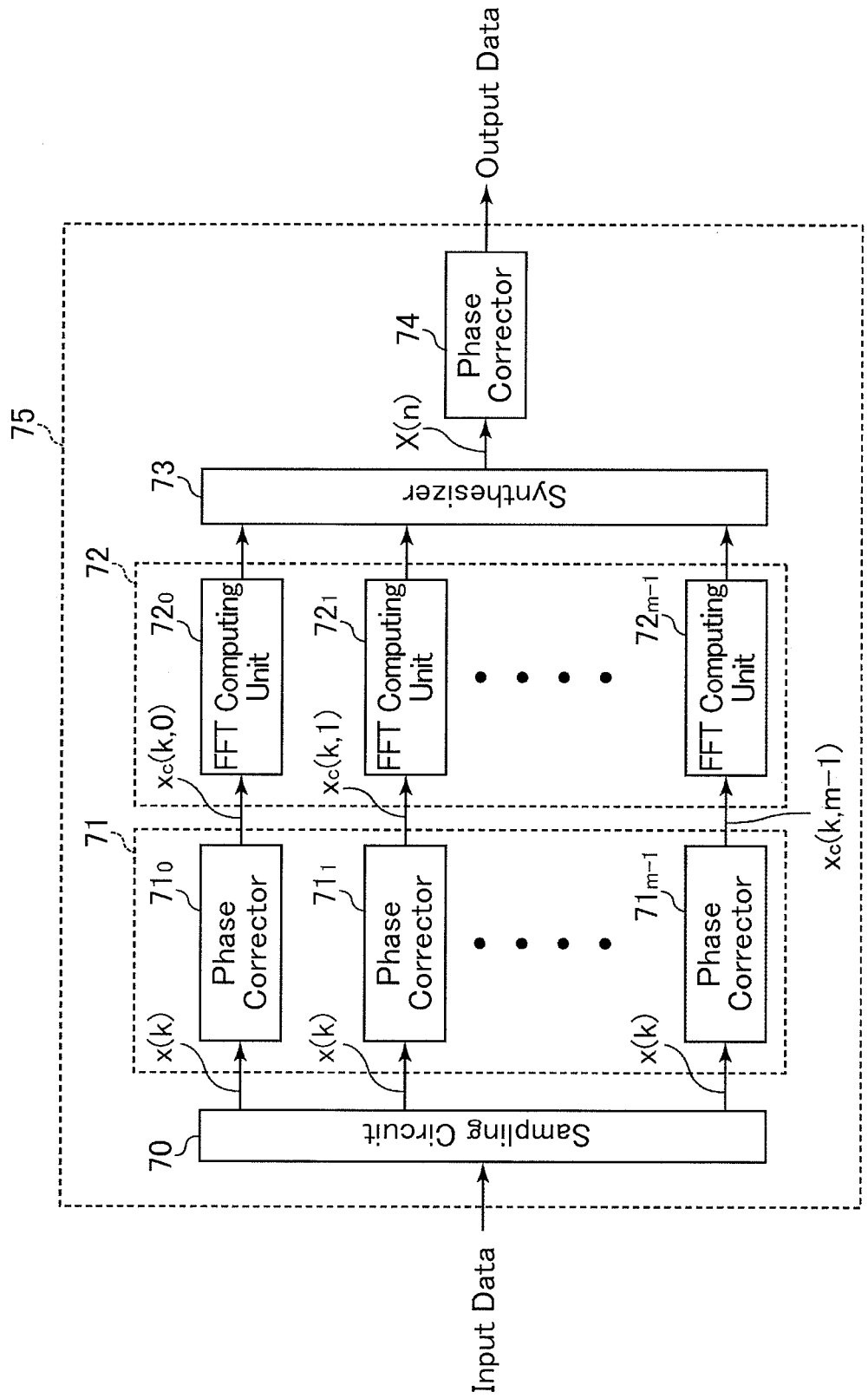
FIG. 7 is a block diagram schematically showing one example of a Fourier transform device.

While continuously extruding a fluororesin film 50 including an ETFE film or PCTFE (trade name: Neoflon ETFE or PCTFE, manufactured by Daikin Industries, Ltd.) from a film roll 51 as shown in FIG. 5, using an imprinting device 53, a mold 52 having a reversal pattern of the multilevel gradation pattern is brought into contact with the fluororesin film 50.

Thus, the multilevel gradation pattern is transferred onto the fluororesin film 50. Then, by a plurality of rolls 54, laminating is performed. Using a cutter 55, the film 50 is cut into a desired size. Thus, it is also possible to form a light-concentrating film capable of omnidirectional light concentration.

(Method for Producing Focusing Element)

A Fresnel lens including various fluorine films such as an ETFE film, and the light-concentrating film produced with the foregoing method are bonded using, for example, an adhesive (trade name: ultraviolet absorptive property imparting type adhesive XN-507, manufactured by Ipposha Oil Industries Co., Ltd.), a highly transparent adhesive sheet using an acrylic adhesive (trade name: highly transparent adhesive transfer tape 8171) manufactured by 3M Co.), a thermoplastic resin, and further a thermoplastic resin (EVA) containing a heat curing agent. As a result, a focusing element is formed. Such a focusing element is set with a given space left with respect to a solar battery cell, resulting in a focusing element having an omnidirectional ability or a focusing element having omnidirectiional and one-point focusing functions. Accordingly, it is possible to produce a high-efficiency solar cell.

Comparative Example 1

Using a Fourier transform device, under the conditions such that the light transmittance of an organic material forming a light-concentrating film is 90%, and the refractive index thereof is 1.50, such that the film thickness (maximum film thickness) of the light-concentrating film is 100 um, and such that the light-concentrating film has an area with a diameter of 160 mm, a binary gradation pattern was calculated using high-speed Fourier transform. As the organic material forming the binary gradation pattern, the case using a PMMA base material (thickness: 2 mm, manufactured by Nihon Tokushu Kogaku Jushi Co.) is assumed.

Figure 1:
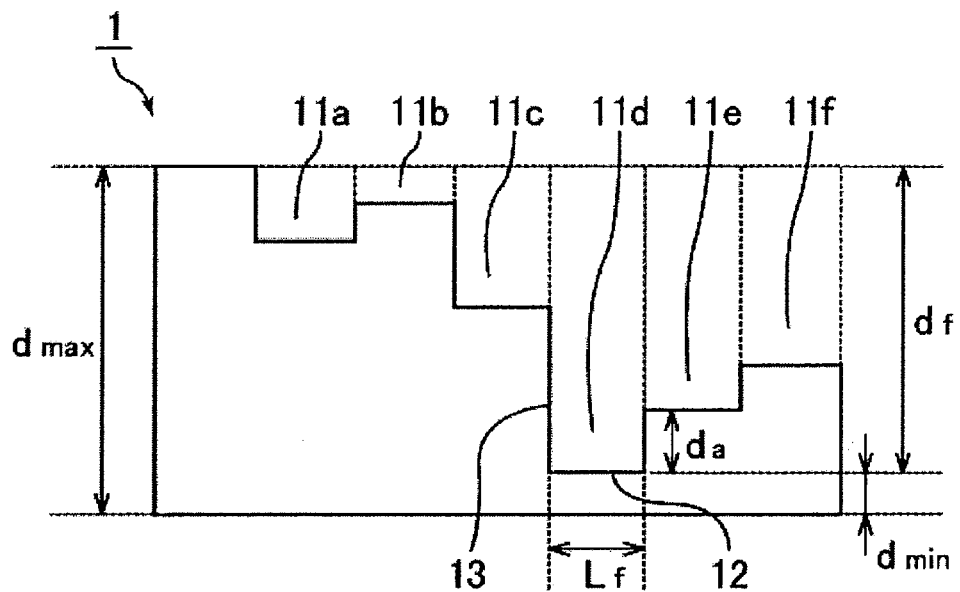
FIG. 1 is a cross-sectional view showing one example of a light-concentrating film of the present invention.
Figure 2:
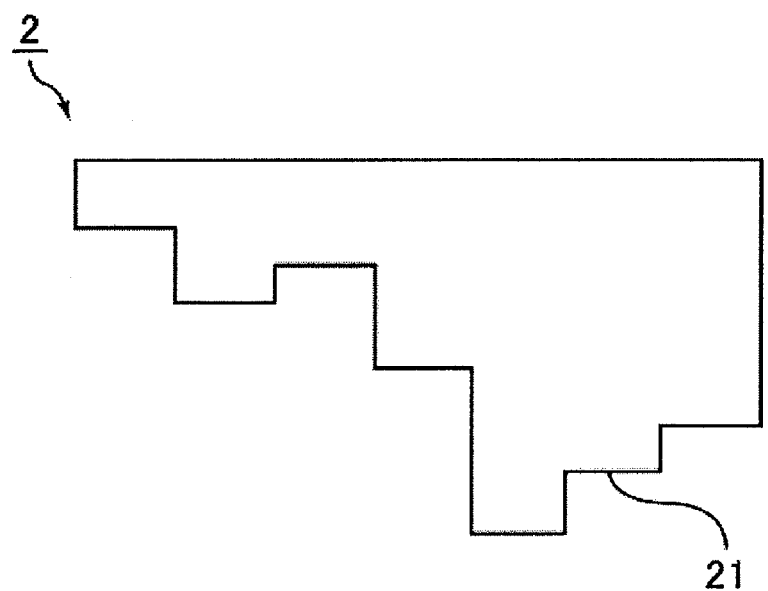
FIG. 2 is a cross-sectional view showing one example of a mold.
Figure 3:
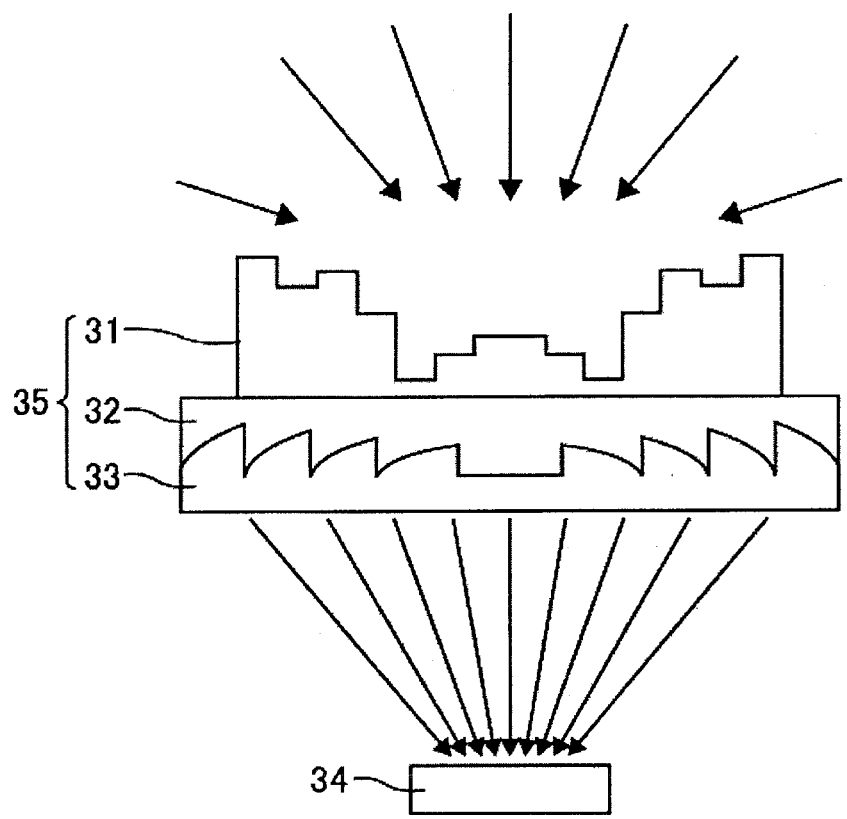
FIG. 3 is a schematic view showing one example of a solar cell.
Figure 4:
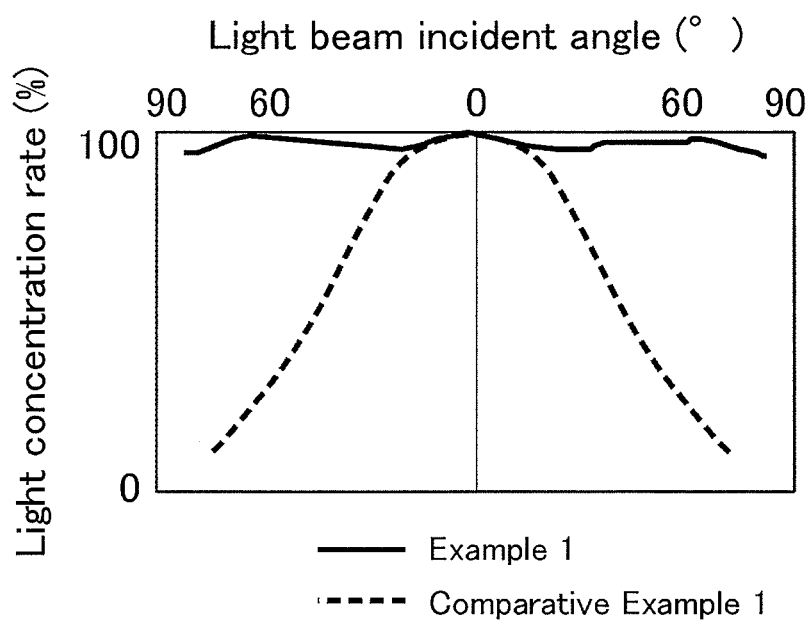
FIG. 4 is a graph showing the light concentration rates of the light-concentrating film of the present invention and a conventional planar film.

The results of the solar light concentration simulation in the case using a gradation pattern obtained by calculation are shown in a graph of FIG. 4. As indicated from FIG. 4, the light-concentrating film having the multilevel gradation pattern obtained in Example 1 shows a highlight concentration rate of an average of 95% or more for a wide angular light beam incident angle. However, with the light-concentrating film having the binary gradation pattern obtained in Comparative Example 1, the light concentration rate in all directions remarkably decreases with an increase in light beam incident angle. Further, as a result of actual measurement, performances following the simulation curve were expressed.

INDUSTRIAL APPLICABILITY

The light-concentrating film of the present invention has the foregoing configuration, and hence, can be used in wide-ranging fields such as a focusing element for solar cell and illumination substitutes by solar lighting.

EXPLANATION OF REFERENCE NUMERALS 1, 31, 61, 91a, 91b, 91c, 91d: light-concentrating film
2, 52: mold
11, 11a, 11b, 11c, 11d, 11e, 11f: recessed portion
12: bottom
13: side surface part
21: reversal pattern
32: adhesion layer
33: Fresnel lens
34: solar battery cell
35: focusing element
51: film roll
53: imprinting device
54: roll
55: cutter
61: side having a multilevel gradation pattern
62: side opposite to the side having a multilevel gradation pattern
70: sampling circuit
71: phase correction part
$71_0$ to $71_{m-1}$: phase corrector
72: Fourier transform part
$72_0$ to $72_{m-1}$: FFT computing unit
73: synthesizer
74: phase corrector
75: Fourier transform device

The invention claimed is:

1. A light-concentrating film, which is a transmission type light-concentrating film made of an organic material,
the light-concentrating film having a multilevel gradation pattern,
wherein the ratio $d_{min}/d_{max}$ of the minimum thickness $d_{min}$ relative to the maximum thickness $d_{max}$ is less than or equal to 25% in a region having the multilevel gradation pattern.

2. The light-concentrating film according to claim 1, concentrating an average of 80% or more of light incident at an angle of 0° to 89° with respect to a direction of the normal to the light-concentrating film.

3. The light-concentrating film according to claim 1,
wherein the multilevel gradation pattern is a pattern including a combination of two or more recessed portions with different depths, and
a depth of at least one recessed portion is larger than a width of the recessed portion.

4. The light-concentrating film according to claim 1,
wherein the organic material has a refractive index of 1.30 to 1.65.

5. The light-concentrating film according to claim 1,
wherein the organic material is a fluororesin.

6. The light-concentrating film according to claim 1,
wherein the multilevel gradation pattern is a pattern calculated using discrete Fourier transform so as to concentrate an average of 80% or more of light incident at an angle of 0° to 89° with respect to a direction of the normal to the light-concentrating film.

7. A focusing element, comprising the light-concentrating film according to claim 1.

8. The focusing element according to claim 7, further comprising at least one lens selected from the group consisting of a Fresnel lens and a lenticular lens.

9. The focusing element according to claim 8, wherein the lens is made of a fluororesin.

10. A solar cell comprising the focusing element according to claim 7.

11. A method for producing the light-concentrating film according to claim 1, comprising the steps of:
calculating a multilevel gradation pattern using discrete Fourier transform, and
forming the light-concentrating film having the multilevel gradation pattern.

12. The method for producing the light-concentrating film according to claim 11,
wherein the step of forming the light-concentrating film includes:

a step of forming a mold having a reversal pattern of the multilevel gradation pattern calculated by discrete Fourier transform; and a step of bringing the mold into contact with a film made of an organic material, and forming the light-concentrating film having the multilevel gradation pattern.

13. The method for producing the light-concentrating film according to claim 11, wherein the step of forming the light-concentrating film includes a step of irradiating a film made of an organic material with a laser, and forming the light-concentrating film having the multilevel gradation pattern.

14. A focusing method using the light-concentrating film according to claim 1, comprising the steps of:

making light incident upon a side of the light-concentrating film having the multilevel gradation pattern; and emitting the incident light from a side of the light-concentrating film, opposite to the light incident side.

\* \* \* \* \*